United States Patent
Berbee et al.

(10) Patent No.: US 10,696,757 B2
(45) Date of Patent: Jun. 30, 2020

(54) HIGH PRESSURE FREE RADICAL POLYMERIZATIONS

(71) Applicant: Dow Global Technologies LLC, Midland, MI (US)

(72) Inventors: Otto J. Berbee, Hulst (NL); Joaquin Flores, Aguilar de Campoo (ES); Cornelis J F Hosman, Jzendijke (NL); Nhi Dang, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 60 days.

(21) Appl. No.: 15/769,285

(22) PCT Filed: Nov. 10, 2016

(86) PCT No.: PCT/US2016/061399
§ 371 (c)(1),
(2) Date: Apr. 18, 2018

(87) PCT Pub. No.: WO2017/083563
PCT Pub. Date: May 18, 2017

(65) Prior Publication Data
US 2018/0305475 A1 Oct. 25, 2018

(30) Foreign Application Priority Data

Nov. 10, 2015 (EP) ..................... 15382556

(51) Int. Cl.
*C08F 10/02* (2006.01)
*C08F 2/01* (2006.01)
*C08F 2/38* (2006.01)

(52) U.S. Cl.
CPC ............... *C08F 10/02* (2013.01); *C08F 2/01* (2013.01); *C08F 2/38* (2013.01); *Y02P 20/582* (2015.11)

(58) Field of Classification Search
None
See application file for complete search history.

(56) References Cited

U.S. PATENT DOCUMENTS

| | | |
|---|---|---|
| 4,135,044 A | 1/1979 | Beals |
| 5,844,045 A | 12/1998 | Kolthammer et al. |

(Continued)

FOREIGN PATENT DOCUMENTS

| | | |
|---|---|---|
| EP | 1861434 B1 | 4/2013 |
| GB | 1370101 A | 10/1974 |

(Continued)

OTHER PUBLICATIONS

Product Data Sheet Trigonox 145-E85; from AkzoNobel Functional Chemicals; Jan. 2014; 1-3 pages; XL65689.05; www.akzonobel.com/polymer.

(Continued)

*Primary Examiner* — Richard A Huhn
(74) *Attorney, Agent, or Firm* — Dinsmore & Shohl LLP

(57) ABSTRACT

A process is provided to form an ethylene-based polymer, in the presence of at least one free-radical, said process comprises at least the following: polymerizing a mixture comprising ethylene, in a reactor configuration comprising at least three reaction zones, and comprising two ethylene feed streams, and wherein the ratio ($R_{LCBf40\%}$), in percent, of the "LCB content of the first 40 wt % of the total polymer formed" to "the total LCB content in the final polymer" is ≤22.5%; and wherein the amount of ethylene, and optionally one or more comonomers, and optionally one or more CTAs, fed to the first reaction zone, is from 40 mole % to 80 mole %, based on the total moles of ethylene, and optionally one or more comonomers, and optionally one or more CTAs, fed to the polymerization.

10 Claims, 4 Drawing Sheets

(56) References Cited

U.S. PATENT DOCUMENTS

| | | | |
|---|---|---|---|
| 5,869,575 | A | 2/1999 | Kolthammer et al. |
| 6,448,341 | B1 | 9/2002 | Kolthammer et al. |
| 6,538,070 | B1 | 3/2003 | Cardwell et al. |
| 6,545,088 | B1 | 4/2003 | Kolthammer et al. |
| 6,566,446 | B1 | 5/2003 | Parikh et al. |
| 7,582,709 | B2 | 9/2009 | Goossens et al. |
| 7,745,550 | B2 | 6/2010 | Donck et al. |
| 8,445,606 | B2 | 5/2013 | Lammens et al. |
| 2010/0087606 | A1* | 4/2010 | Karjala ............ C08F 10/02 526/64 |
| 2013/0295289 | A1 | 11/2013 | Littmann et al. |
| 2014/0288257 | A1 | 9/2014 | Zschoch et al. |

FOREIGN PATENT DOCUMENTS

| | | |
|---|---|---|
| JP | 5034422 B2 | 7/2012 |
| WO | 0168723 A2 | 9/2001 |
| WO | 0214379 A1 | 2/2002 |
| WO | 2012084787 A1 | 6/2012 |
| WO | 2012117039 A1 | 9/2012 |
| WO | 2013059042 A1 | 4/2013 |
| WO | 2015166297 A1 | 11/2015 |
| WO | WO-2015166297 A1 * | 11/2015 |
| WO | 2016109266 A1 | 7/2016 |
| WO | 2017083552 A1 | 5/2017 |
| WO | 2017083559 A1 | 5/2017 |

OTHER PUBLICATIONS

Extended Search Report pertaining to European Patent Application No. 15382556.7 dated Apr. 21, 2016.
International Search Report and Written Opinion pertaining to PCT/US2016/061399 dated Jan. 18, 2017.
International Preliminary Report on Patentability pertaining to PCT/US2016/061399 dated Dec. 26, 2017.
"Optimum Lubrication Oil in LDPE Process", IP.com Prior Art Database Technical Disclosure, IP.com No. IPCOM000209993D, Publication Date: Aug. 19, 2011.
Ehrlich et al., "Fundamentals of the free radical polymerization of ethylene", Adv. Polymer Sci., vol. 7, 386-448 (1970).
Goto et al., "Computer Model for Commercial High-Pressure Polyethylene Reactor Based on Elementary Reaction Rates Obtained Experimentally", J. Applied Polymer Science, 36, 21-40, 1981.
Luft, Gerhard, Chem.-Ing.-Tech., Hochdruck-Polyaethylen, vol. 51 (1979) Nr. 10, pp. 960-969.
Mortimer, G., "Chain transfer in ethylene polymerization", Journal of Polymer Science: Part A-1, vol. 4, p. 881-900 (1966).
Mortimer, G., "Chain transfer in ethylene polymerization. IV. Additional study at 1360 atm and 130° C.", Journal of Polymer Science: Part A-1, ; vol. 8, p. 1513-1523 (1970).
Mortimer, G., "Chain transfer in ethylene polymerization. Part V. The effect of temperature", Journal of Polymer Science: Part A-1, ; vol. 8, p. 1535-1542 (1970).
Mortimer, G., "Chain transfer in ethylene polymerization VII. Very reactive and depletable transfer agents", Journal of Polymer Science: Part A-1, , vol. 10, p. 163-168 (1972).
Yamamoto et al., "Rate Constant for Long-Chain Branch Formation in Free-Radical Polymerization of Ethylene", J. Macromol. Science-Chem. 1979, 1067.
Office Action pertaining to corresponding Chinese Patent Application No. 201680076023.8, dated Jan. 3, 2020, received Feb. 18, 2020.

* cited by examiner

US 10,696,757 B2

HIGH PRESSURE FREE RADICAL POLYMERIZATIONS

REFERENCE TO RELATED APPLICATIONS

The present application claims the priority to European Patent Application 15382556.7, filed Nov. 10, 2015.

BACKGROUND OF INVENTION

Low Density Poly Ethylene (LDPE) is produced in an autoclave and/or tubular reactors at high pressure and temperature. High pressure, free-radical polymerizations are disclosed in the following references: U.S. Pat. Nos. 8,445, 606, 4,135,044, 7,582,709, and JP050534422 (Abstract). LDPE products with different properties, for example, different levels of long chain branching, different molecular weight distributions, and different densities, can be produced by applying different reactor configurations, such as multiple ethylene-based feed flow injections, and multiple reaction zones. Extrusion coating resins typically require high levels of long chain branching and broad molecular weight distribution (MWD), and such resins are typically polymerized using high peak or control temperatures. On the other hand, narrow MWD resins (having low level of long chain branching), required for high clarity film application, are typically polymerized at lower temperatures. Operating at high or low peak temperatures will strongly affect the conversion level and the polymer output of tubular LDPE plants. Typically, broad MWD resins are polymerized at lower costs, while narrow MWD resins are polymerized at higher costs.

There is a need for new polymerization processes that can be used to prepare ethylene-based polymers that have constant and/or high Long Chain Branching (LCB) levels, yet MWD varying from narrow to broader levels. There is a further need for such processes that result in high conversion levels. These needs have been met by the following invention.

SUMMARY OF THE INVENTION

A process to form an ethylene-based polymer, in the presence of at least one free-radical, said process comprises at least the following:

polymerizing a mixture comprising ethylene, in a reactor configuration comprising at least three reaction zones, and comprising two ethylene feed streams, and wherein the ratio ($R_{LCBf\ 40\%}$), in percent, of the "LCB content of the first 40 wt % of the total polymer formed" to "the total LCB content in the final polymer" is ≤22.5%; and wherein the amount of ethylene, and optionally one or more comonomers, and optionally one or more Chain Transfer Agents (CTAs), fed to the first reaction zone, is from 40 mole % to 80 mole %, based on the total moles of ethylene, and optionally one or more comonomers, and optionally one or more CTAs, fed to the polymerization.

DETAILED DESCRIPTION

Figure 1:
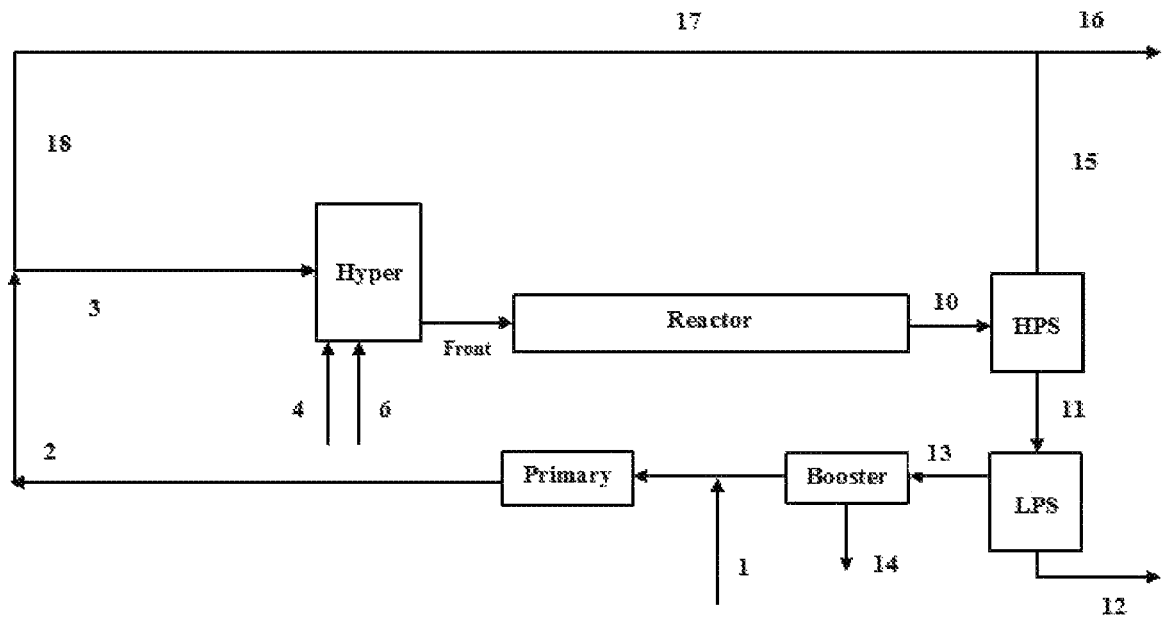
FIG. 1 depicts a polymerization flow diagram containing a tubular reactor for comparative polymerizations CP1, CP1.1, CP2 and CP3.

New polymerization processes have been discovered that provide ethylene-based polymers that have a significant level of LCBf and narrower MWD, at a constant conversion level. It has also been discovered that broad and narrow MWD resins can be produced at constant polymer output. It has also been discovered that fresh ethylene and/or make-up CTA distributions can be implemented over the reactor feed stream(s) to further enhance product and process capabilities together with above inventive operation.

As discussed above, a process is provided to form an ethylene-based polymer, in the presence of at least one free-radical, said process comprises at least the following:

polymerizing a mixture comprising ethylene, in a reactor configuration comprising at least three reaction zones, and comprising two ethylene feed streams, and wherein the ratio ($R_{LCBf\ 40\%}$), in percent, of the "LCB content of the first 40 wt % of the total polymer formed" to "the total LCB content in the final polymer" is ≤22.5%; and wherein the amount of ethylene, and optionally one or more comonomers, and optionally one or more CTAs, fed to the first reaction zone, is from 40 mole % to 80 mole %, based on the total moles of ethylene, and optionally one or more comonomers, and optionally one or more CTAs, fed to the polymerization.

An inventive process may comprise a combination of two or more embodiments described herein.

In one embodiment, when the polymerization temperature (the temperature in the reactor, excluding the pre-heater section) in the reactor is equal to, or less than, 180° C., the cooling medium temperature is equal to, or higher than, 180° C., or preferably equal to, or higher than, 185° C., more preferably equal to, or higher than, 190° C., most preferably equal to, or higher than, 195° C. In one embodiment, when the polymerization temperature is equal to, or less than, 190° C., the cooling medium temperature is equal to, or higher than 180° C., or preferably equal to, or higher than 185° C., more preferably equal to, or higher than 190° C., most preferably equal to, or higher than 195° C. In one embodiment, when the polymerization temperature is equal to, or less than, 200° C., the cooling medium temperature is equal to, or higher than 180° C., or preferably equal to, or higher than 185° C., more preferably equal to, or higher than 190° C., most preferably equal to, or higher than 195° C.

In one embodiment, the reactor configuration contains only two ethylene feed streams.

In one embodiment the first 40 wt % of the total polymer formed has an LCB content ≤22.0%, or ≤21.5%, or ≤21.0%, or ≤20.5% of the total LCB content in the final polymer.

In one embodiment, the LCBf ratio ($R_{LCBf\ 60\%/LCBf\ 40\%}$) of the "last 60 wt % total polymer formed" to the "first 40 wt % of total polymer formed," is ≥6.8, or ≥6.9, or ≥7.0, or ≥7.1, or ≥7.2.

In one embodiment, the amount of ethylene based feed, fed to the first reaction zone, is from 45 mole % to 75 mole %, or from 40 to 70 mole %, based on the total moles of ethylene, and optionally one or more comonomers, and optionally one or more CTAs, fed to the polymerization.

In one embodiment, the ethylene conversion is greater than, or equal to 28%, or greater than, or equal to, 29%, or greater than, or equal to, 30%, or greater than, or equal to, 31%.

In one embodiment, ethylene is fed to a first reaction zone (i=1) and to one subsequent reaction zone (i=n, and n>1), and wherein the ethylene comprises fresh ethylene and recycle ethylene, and wherein for the subsequent reaction zone, the ratio, Rn, of "mole fraction of fresh ethylene fed to the first reaction zone (RZ1)" to "mole fraction of fresh ethylene fed to the nth reaction zone (RZn)" is (Rn=RZ1/RZn) less than, or equal to, 1; and wherein the "total amount of ethylene fed to the polymerization process" derives from at least one fresh ethylene stream and at least one recycled ethylene stream.

In one embodiment, the first ethylene feed stream comprises from 0 to 100 mole % of the total amount of fresh CTA added to the polymerization, and wherein the activity of the CTA system in the first ethylene feed is greater than, or equal to, the activity of the CTA system in the second ethylene feed.

In one embodiment, the first ethylene feed stream comprises from 20 to 100 mole %, or from 30 to 100 mole %, or from 40 to 100 mole % of the total amount of fresh CTA added to the polymerization, and wherein the activity of the CTA system in the first ethylene feed is greater than, or equal to, the activity of the CTA system in the second ethylene feed.

In one embodiment, the first ethylene feed stream comprises from 20 to 100 mole %, or from 30 to 100 mole %, or from 40 to 100 mole % of the total amount of fresh CTA added to the polymerization, and wherein the activity of the CTA system in the first ethylene feed is equal to the activity of the CTA system in the second ethylene feed. In one embodiment, the first ethylene feed stream comprises from 20 to 100 mole %, or from 30 to 100 mole %, or from 40 to 100 mole % of the total amount of fresh CTA added to the polymerization, and wherein the activity of the CTA system in the first ethylene feed is greater than, the activity of the CTA system in the second ethylene feed. In one embodiment, the first ethylene feed stream comprises from 20 to 100 mole %, or from 30 to 100 mole %, or from 40 to 100 mole % of the total amount of CTA added to the polymerization, and wherein the activity of the CTA system in the first ethylene feed is greater than, or equal to, the activity of the CTA system in the third ethylene feed.

In one embodiment, the ethylene-based polymer has a melt index (I2) from 0.10 to 20.0 g/10 min.

In one embodiment, the mixture further comprises at least one CTA selected from an aldehyde, an alkane, a ketone, an ester, an alpha-olefin, or a combination thereof.

In one embodiment, the mixture further comprises at least one CTA selected from an aldehyde, an alkane, a ketone, an alcohol, an ester, a mercaptan, a phosphine, a phosgene, an alpha-olefin, or a combination thereof. In one embodiment, the mixture further comprises at least one CTA selected from an aldehyde, an alkane, a ketone, an alcohol, an ester, an alpha-olefin, or a combination thereof.

In one embodiment, the total ethylene based feed flow to the reactor configuration is from 30 to 400 tons per hr, or from 50 to 400 tons per hour, or from 75 to 400 tons per hour, or from 100 to 400 tons per hour. In one embodiment, the total ethylene based feed flow to the reactor configuration is from 40 to 350 tons per hour, or from 50 to 300 tons per hour.

An inventive process may comprise a combination of two or more embodiments described herein.

In one embodiment the reactor configuration comprises at least one tubular reactor.

In one embodiment, the polymerization takes place in one reactor with at least four reaction zones. In one embodiment, the polymerization takes place in a reactor configuration comprising reaction zone 1 and reaction zone i (i≥2) and wherein reaction zone i is downstream from reaction zone 1. In an embodiment, i is from 2-5, or from 2-4. In one embodiment, i=2.

In one embodiment the only reactors in the reactor configuration are tubular reactors.

In one embodiment, the first reaction zone is a tubular reaction zone. In one embodiment, each reaction zone is a tubular reaction zone.

In one embodiment, the number of reaction zones equals i, and wherein i is ≥3, or ≥4, or ≥5, or ≥6, or ≥7, or ≥8, or ≥9, or ≥10, or ≥20.

In one embodiment, the reactor configuration comprises at least one Primary compressor and at least one Booster compressor. In one embodiment, the process comprises only one Primary compressor.

In one embodiment, the ethylene-based polymer is a polyethylene homopolymer, and further a LDPE. In one embodiment, the ethylene-based polymer is LDPE In one embodiment, the ethylene-based polymer is an ethylene-based interpolymer comprising at least one comonomer.

In one embodiment, the ethylene fed to the first reaction zone is at least 40 percent of the total ethylene fed to the polymerization. In one embodiment, the ethylene fed to the first reaction zone is from 40 to 80 mole percent, or from 40 to 75 mole percent, or from 40 to 75 mole percent, or from 45 to 75 mole percent, or from 45 to 70 mole percent, or from 45 to 60 mole percent, or from 45 to 55 mole percent of the total ethylene fed to the polymerization.

In one embodiment, the ethylene fed to the first reaction zone is at least 40 percent of the total ethylene fed to the polymerization. In one embodiment, the ethylene fed to the first reaction zone is from 50 to 80 mole percent, or from 50 to 75 mole percent, or from 50 to 70 mole percent, or from 50 to 65 mole percent, or from 50 to 60 mole percent, or from 50 to 55 mole percent of the total ethylene fed to the polymerization.

In one embodiment, the fresh ethylene does not contain a chain transfer agent other than one or more residual compounds originating from the ethylene production/fractionation process.

In one embodiment, the total amount of fresh (make-up) ethylene is distributed to all reaction zones receiving an ethylene feed stream. In one embodiment, the fresh ethylene is only distributed to the reaction zone i (i>1).

In one embodiment, total amount of fresh (make-up) CTA is only distributed to the first reaction zone. In one embodiment, total amount of fresh (make-up) CTA is distributed to all reaction zones receiving an ethylene-based feed stream.

In one embodiment, no fresh CTA is distributed to the first reaction zone.

In one embodiment, each feed to each reaction zone contains the same CTA system. In a further embodiment, the CTA system of each feed contains a single CTA.

In one embodiment, each feed to each reaction zone contains a CTA system different in composition and/or level.

In a further embodiment the CTA system of each feed contains a single CTA.

In one embodiment, the polymerization is carried out at an elevated pressure (inlet pressure) of at least 1000 bar (100 MPa).

In one embodiment, each reaction zone, independently, is run at a maximum temperature less than 400° C., and an inlet pressure less than 1000 MPa, or less than 500 MPa.

In one embodiment, the ratio of the Long Chain Branching of the last 60 wt % polymer formed" to the "first 40 wt % polymer formed" is greater or equal than 7.0, or greater or equal than 7.2, or greater or equal than 7.4, or greater or equal than 7.6.

In one embodiment, the ratio of the Long Chain Branching of the "first 40 wt % polymer formed" to the "final cumulative polymer formed" is less than 22.0%, or less than 21.5%, or less than 21.0%, or less than 20.5%.

In one embodiment, the normalized Molecular Weight Distribution is less than 180%, preferably less than 150%, more preferably less than 120%, and most preferably less than 90%.

In one embodiment, the reactor configuration comprises at least one tubular reactor, and each tubular reactor has one or more cooling zones. In one embodiment, the reactor configuration comprises at least one tubular reactor, and each tubular reactor is equipped with multiple heat transfer zones, and where heat is exchanged between the process side and a heat transfer medium.

In one embodiment, the reactor configuration comprises at least one tubular reactor, and the cooling and/or heating to each reactor, is provided by pressurized liquid water operating in a co-current mode and/or counter current mode, in multiple cooling zones surrounding the reactor.

In one embodiment, the reactor configuration comprises at least one tubular reactor, and the cooling and/or heating to each reactor, is provided by a liquid heat transfer fluid (for example, a silicon oil and/or a polygycol (e.g., DOW-THERM fluids)), operating in a co-current mode and/or counter current mode, in multiple cooling zones surrounding the reactor.

In one embodiment, a high pressure reactor tube is typically equipped with a jacket to allow heat transfer with the help of heat transfer medium flowing through this jacket. In one embodiment, the reactor configuration comprises at least one tubular reactor, and each tubular reactor is equipped with multiple jackets, and wherein each jacket has one inlet and one outlet, and wherein the respective inlets and outlets of the two or more jackets are connected in series, to each other, to form one heat transfer zone. In a further embodiment, the inlet temperatures of the heat transfer zones are uniform, and each inlet temperature is from 20 and 240° C. In another embodiment, at least two inlet temperatures of the heat transfer zones are uniform, and wherein each inlet temperature is from 20 and 240° C. In another embodiment, each inlet temperature of a heat transfer zone is different from the inlet temperatures of the other heat transfer zones, and each inlet temperature is from 20 and 240° C.

In one embodiment, the reactor configuration comprises at least one tubular reactor, and each tubular reactor is equipped with multiple jackets, and wherein each jacket has one inlet and one outlet, and wherein the respective inlets and outlets of all of the jackets are connected in series, to each other, to form one heat transfer zone. In a further embodiment, the inlet temperatures of the heat transfer zones are uniform, and each inlet temperature is from 20 and 240° C. In another embodiment, at least two inlet temperatures of the heat transfer zones are uniform, and wherein each inlet temperature is from 20 and 240° C. In another embodiment, each inlet temperature of a heat transfer zone is different from the inlet temperatures of the other heat transfer zones, and each inlet temp. is from 20 and 240° C.

In one embodiment, the ethylene-based polymer comprises ethylene and one or more comonomers, and preferably one comonomer. Comonomers include, but are not limited to, α-olefins, acrylates, methacrylates and anhydrides, each typically having no more than 20 carbon atoms. The α-olefin comonomers, which have a combined monomer and CTA functionality, may have 3 to 10 carbon atoms, or in the alternative, the α-olefin comonomers may have 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene and combinations thereof. Preferably, the α-olefin comonomers are selected from propylene, 1-butene and combinations thereof.

Initiators

Free radical initiators are generally used to produce the inventive ethylene-based polymers. A free radical initiator, as used here, refers to a free radical generated by chemical and/or radiation means. Exemplary free radical initiators include organic peroxides including, but not limited to, cyclic peroxides, diacyl peroxides, dialkyl peroxides, hydroperoxides, peroxycarbonates, peroxydicarbonates, peroxyesters, and peroxyketals. Preferred initiators are t-butyl peroxy pivalate, di-t-butyl peroxide, t-butyl peroxy acetate and t-butyl peroxy-2-hexanoate, or mixtures thereof. Furthermore oxygen can be used as initiator. In one embodiment, these organic peroxide initiators are used in an amount from 0.001-0.2 wt %, based upon the weight of polymerizable monomers.

Peroxide initiator can be characterized and classified with their half life temperature at certain time intervals. For instance the half life temperature at 0.1 h indicates the temperature at which an initiator is dissociated into radicals for 50% in 0.1 h or 6 minutes. AkzoNobel shows in their brochure "Initiators for High Polymers" half life temperatures at 0.1, 1.0 and 10 h for their commercial organic peroxide initiators. Due to typical residence times of less than five minutes in high pressure reactor system and less than two minutes in the individual reactor zones the half life temperature at 0.1 h are relevant for the classification and selection of organic peroxide initiators. The Organic peroxides can be classified in the following classes: Class 1: Low temperature initiator, with half life temperature at 0.1 hour, varying from 70 to 120° C., these peroxides are typically used to start the polymerization; Class 2: Medium temperature initiator, with half life temperature at 0.1 hour, varying from 120 to 150° C.; Class 3: High temperature initiator, with half life temperature at 0.1 hour, above 150° C. Oxygen is thought to work through formation of intermediate organic hydroperoxides, which will typically decompose at temperatures starting at 180° C., therefore oxygen can be considered as a high temp. initiator (Class 3). Organic peroxides are often applied in mixtures of low and high temp. initiators, in order to start and/or accelerate temp. development by the lowest temp. initiator class, while the control temp., respectively maximum zone temp. for autoclave reaction zone and maximum peak temp. for tubular reactor zone, is controlled and determined by the highest temp. initiator class. The temp. control of a reaction zone is therefore a function of the molar sum of initiators of the highest temperature class, fed into each zone, and can be further affected by the efficiency, in which the applied higher temperature peroxides will dissociate into or generate polymerization radicals.

One initiator or a mixture of initiators, potentially diluted with a solvent, and injected into a reaction zone i, is called initiation system for reaction zone i. In one embodiment oxygen is used alone, or in combination with other initiators, as a high temperature initiator. In one embodiment the initiator usage and efficiency are affected by the so-called cage-in effect or potential to form effective polymerization radicals.

In one embodiment, an initiator is added to at least one reaction zone, and the initiator has a half-life temperature, at one second, greater than 255° C., preferably greater than 260° C. In a further embodiment, such initiators are used at a peak polymerization temperature from 320° C. to 350° C. In a further embodiment, the initiator comprises at least one peroxide group incorporated in a ring structure. Examples of such initiators include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6, 6,9,9-hexamethyl-1,2,4,5-tetroxonane) available from United Initiators. See also International Publication Nos. WO 02/14379 and WO 01/68723.

In one embodiment, the polymerization pressure as measured at the first inlet of the reactor is from 1000 bar to 4000 bar, or from 1400 to 3600 bar, or from 1800 to 3200 bar.

Depending on the final article processing step and the end-usage, different product quality targets are set for each product grade. Melt-index, density and melt elasticity are the main parameters to describe and to measure the product quality and the consistency of the produced product. Melt index reflects the average molecular weight, and can be adjusted/controlled through varying the level and composition of the CTA system.

The short chain branching (SCB) level is an indicator for product density, which is typically allowed varying in certain ranges, for instance 924±10 kg/m$^3$. The long chain branching (LCB) level strongly affects the molecular weight distribution, and consequently the visco-elastic properties, for instance melt strength, and is important in applications, such as blown and cast film, foam, extrusion coating etc. Properties like SCB and LCB level are strongly affected by the applied polymerization temperature and pressure levels. Additionally the LCB level is also affected by the polymer level profile in the reactor system.

Additives

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10% of the combined weight of one or more additives, based on the weight of the inventive polymer. In one embodiment the polymers of this invention are treated with one or more stabilizers, for example, antioxidants, such as IRGANOX 1010, IRGANOX 1076 and IRGAFOS 168. In general, the polymers are treated with one or more stabilizers before extrusion or other melt processes.

An inventive composition may further comprise at least one other polymer, in addition to an inventive ethylene-based polymer. Blends and mixtures of the inventive polymer with other polymers may be prepared. Suitable polymers for blending with the inventive polymers include natural and synthetic polymers. Exemplary polymers for blending include propylene-based polymers (both impact modifying polypropylene, isotactic polypropylene, atactic polypropylene, and random propylene/ethylene copolymers), various types of ethylene-based polymers, including high-pressure, free-radical LDPE, heterogeneously branched LLDPE (typically via Ziegler-Natta catalysis), homogeneously branched linear or substantially linear PE (typically via single-site, including metallocene catalysis), including multiple reactor PE ("in-reactor" compositions of heterogeneously branched PE and homogeneously branched PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.); and U.S. Pat. No. 6,448,341 (Kolthammer et al.)), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Other ethylene-based polymers include homogeneous polymers, such as olefin plastomers and elastomers (for example, polymers available under the trade designations AFFINITY Plastomers and ENGAGE Elastomers (The Dow Chemical Company) and EXACT (ExxonMobil Chemical Co.)). Propylene-based copolymers (for example, polymers available under the trade designation VERSIFY Plastomers & Elastomers (The Dow Chemical Company) and VISTAMAXX (ExxonMobil Chemical Co.) can also be useful as components in blends comprising an inventive polymer.

Applications

The polymers, polymer blends and compositions of this invention may be employed in a variety of conventional thermoplastic fabrication processes to produce useful articles, including extrusion coating onto various substrates; monolayer and multilayer films; molded articles, such as blow molded, injection molded, or rotomolded articles; coatings; fibers; and woven or non-woven fabrics. An inventive polymer may be used in a variety of films, including but not limited to, clarity shrink films, collation shrink films, cast stretch films, silage films, stretch hood, sealants, and diaper back sheets. Other suitable applications include, but are not limited to, wires and cables, gaskets and profiles, adhesives; footwear components, and auto interior parts.

Also is provided an ethylene-based polymer made by an inventive process.

In one embodiment, the ethylene-based polymer is a polyethylene homopolymer. In another embodiment, the ethylene-based polymer is an ethylene-based interpolymer.

In one embodiment, the ethylene-based polymer is LDPE.

In one embodiment, the ethylene-based polymer has a density from 0.910 to 0.940 g/cm$^3$ (1 cm$^3$=1 cc). In one embodiment, the ethylene-based polymer has a melt index from 0.1 to 1000 g/10 min. In one embodiment, the ethylene-based polymer has a melt index from 0.1 to 100 g/10 min. In one embodiment, the ethylene-based polymer has a melt index from 0.15 to 50 g/10 min. In one embodiment, the ethylene-based polymer has a melt index from 0.2 to 20 g/10 min. In one embodiment, the ethylene-based polymer has a density from 0.910 to 0.940 g/cm$^3$, and a melt index from 0.1 to 1000 g/10 min.

An inventive polymer may comprise a combination of two or more embodiments as described herein. Also is provided a composition comprising an inventive ethylene-based polymer. In one embodiment, the composition further comprises another ethylene-based polymer.

Also is provided an article comprising at least one component formed an inventive composition. In one embodiment, the article is an extrusion coating resin. In another embodiment, the article is a film. In another embodiment, the article is an insulation material and/or a protection layer around a metal wire. In another embodiment, the article is foam. An inventive article may comprise the combination of two or more embodiments as described herein.

DEFINITIONS

Unless stated to the contrary, implicit from the context, or customary in the art, all parts and percents are based on weight, and all test methods are current as of the filing date of this application.

The terms "ethylene feed stream" or "ethylene based feed" or "ethylene based feed stream," or "ethylene feed," as used herein, refer to a feed stream to a reaction zone, and which contains a majority amount of ethylene, based on the molar amount of all of the components in the feed stream. Optionally one of more chain transfer agents, comonomers, other process components (like lubrication oil, solvent, etc.) and/or impurities (as for instance initiator degradation products) might be present in the feed stream.

The term "ethylene-based feed components," as used herein, refer to ethylene (fresh and/or recycled), and optionally CTA (fresh and/or recycled), solvent (fresh and/or recycled), comonomer(s) (fresh and/or recycled) and/or other components (for example, including, but not limited to, fresh and/or recycled lubrication oil(s), antioxidant(s), ethane, methane and/or initiator dissociation products), added to a reaction zone at an inlet to the reaction zone. In one embodiment, the ethylene-based feed components comprise the following: ethylene (fresh and/or recycled), and optionally CTA (fresh and/or recycled), solvent (fresh and/or recycled), comonomer(s) (fresh and/or recycled) and/or other components selected from the following: fresh and/or recycled lubrication oil(s), antioxidant(s), ethane, methane and/or initiator dissociation products. In another embodiment, the ethylene-based feed components comprise the following: ethylene (fresh and/or recycled), and optionally CTA (fresh and/or recycled), solvent (fresh and/or recycled), comonomer(s) (fresh and/or recycled) and/or other components selected from the following: fresh and/or recycled lubrication oil(s), antioxidant(s), ethane, methane, initiators (for example, oxygen) and/or initiator dissociation products.

The term "LCB content" refers to a level of long chain branches per 1000 carbons (total carbons) incorporated in the polymer. The LCB content is calculated with the help of kinetics on "Transfer to Polymer" and "Propagation" of ethylene and optionally present comonomers. Comonomers containing a C=C double bond are represented in the calculation of the LCB level per 1000C by their two carbons in their double bond group. The LCB content can be given as level in the final polymer (final product LCBf), in the progressing polymer formation along the reactor (cumulative LCBf) or in the locally formed polymer as function of the local polymerization conditions in the reactor (local LCBf).

The term "ethylene conversion" refers to weight fraction of the ethylene fed to the reactor, which is incorporated in the final polymer produced.

The term "composition," as used herein, includes a mixture of materials which comprise the composition, as well as reaction products and decomposition products formed from the materials of the composition.

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined below. Trace amounts of impurities may be incorporated into and/or within the polymer. Trace amount of impurities can include initiator residues and other components, like for instance lubrication oil, solvent etc., showing chain transfer activity. The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene, based on the weight of the polymer, and, optionally, at least one comonomer.

The term "ethylene-based interpolymer" refers to an interpolymer that comprises a majority amount of polymerized ethylene, based on the weight of the interpolymer, and at least one comonomer. The term "ethylene-based copolymer" refers to a copolymer that comprises a majority amount of polymerized ethylene, based on the weight of the copolymer, and a comonomer as the only monomer types.

The term "high pressure polymerization process," as used herein, refers to a free radical polymerization process carried out at an elevated pressure (inlet pressure) of at least 1000 bar (100 MPa).

The terms "inlet stream" or "reaction zone inlet stream," as used herein, refer to the total mass flow or total molar flow at the inlet of a reaction zone, and consists of the mass flow or molar flow transferred from the previous reaction zone plus optional ethylene-rich feed streams, plus optionally CTA feed stream, plus optionally initiator feed stream fed optionally alone or together with another feed stream. The terms "side stream" or "side feed stream," as used herein, refer to the ethylene-rich feed stream, CTA system feed stream, and/or initiator system, to sequential reaction zones.

The term "reactor system," as used herein, refers to the devices used to polymerize and isolate a polymer. Such devices include, but are not limited to, one or more reactors, reactor pre-heater(s), monomer-reactor cooling device(s), Hyper-compressor(s), Primary compressor(s), and/or Booster compressor(s).

The term "reactor configuration," as used herein, refers to one or more reactors, and optionally one or more reactor pre-heaters, ethylene feed cooling device, used to polymerize a polymer. Such reactors include, but are not limited to, autoclave reactor(s), tubular reactor(s), and combinations of autoclave and tubular reactors.

The term "inlet pressure" or "reactor inlet pressure", as used herein, refers to the pressure level at the first inlet of the first reaction zone.

The term "reaction zone," as used herein, refers to a reactor zone where polymerization reaction is initiated or reinitiated by the addition of free radicals or components which dissociate into and/or generate free radicals. Typically, the reaction medium is heated and/or cooled by a heat transfer medium flowing through a jacket around the reactor. A reaction zone may also start with the addition of fresh and/or recycled ethylene, and free radicals or components which dissociate into and/or generate free radicals.

The term "first reaction zone," as used herein, refers to the first reactor zone where the polymerization is initiated by the addition of radicals and/or components which dissociate into and/or generate radicals. The first (or other) reaction zone ends at the point where there is a new feed of radicals, and/or components which dissociate into and/or generate radicals, and, optionally, fresh and/or recycled ethylene and/or comonomer(s).

The phrase "maximum temperature for a reaction zone," or "peak temperature," as used herein, refers to the highest temperature measured in a reaction zone, for example, in an autoclave reaction zone (typically, noted as a maximum zone temperature), and in a tubular reaction zone (typically noted as a peak temperature).

Hyper compressor (Hyper), or Secondary compressor, is a device that compresses the following: a) the ethylene-based components coming from the HPR (High Pressure Recycle), and/or b) the ethylene-based components coming from the Primary, each to a pressure level required to feed the reactor at its inlet pressure. This compression can take place in one or multiple compression stages, and can be combined with intermediate cooling. The Hyper comprises a reciprocating plunger compressor, and can consist of single or multiple compressor frame(s).

The term "hyper compressor throughput," as used herein, refers to the net amount of ethylene-based feed components compressed and fed to the reactor configuration. The hyper throughput is a function of the compression volume and the density of the ethylene based components at the suction side. The pressure and temperature conditions at the suction side of the hyper compressor will define the density of the ethylene based components to be compressed. The term "fresh," when used herein, in reference to an ethylene-based feed component (i.e., "fresh ethylene," "fresh CTA"), refers to reactant provided from an external source(s), and not provided internally from a recycled source(s). For example, in an embodiment, fresh ethylene is used as "make-up ethylene" required to compensate for the ethylene consumed by the polymerization and/or lost through, for example, ethylene purge from the process and residual ethylene in the polymer.

The term "recycled," when used herein, in reference to a reactant (i.e., "recycled ethylene," "recycled CTA"), refers to unreacted reactant separated from the polymer in the high pressure separator(s) and/or the low pressure separator(s), and returned/compressed to the reactor.

The terms "feed," "feed flow," or "feed stream," as used herein, refer to fresh and/or recycled components (for example, ethylene, initiator, CTA, and/or solvent) added to a reaction zone at an inlet.

The term "mole fraction," as used herein, refers to the molar ratio of one component in a mixture to the total moles of the components of the mixture. Molar fraction can be determined by calculating the ratios of molar amounts or molar flows.

The phrase "mole fraction of fresh ethylene fed to the first reaction zone (RZ1)," as used herein, refers to the molar amount of fresh ethylene fed (via a front stream) to the first reaction zone, divided by the molar amount of ethylene plus optional comonomer(s) plus optional CTA(s) fed (via a front stream) to the first reaction zone.

The phrase "mole fraction of fresh ethylene fed to the nth reaction zone (RZn)," as used herein, refers to the molar amount of fresh ethylene fed (via a side stream) to the nth reaction zone divided by the molar amount of ethylene plus optional comonomer(s) plus optional CTA(s) fed (via a side stream) to the nth reaction zone.

The term "CTA system" includes a single CTA, or a mixture of CTAs, added to the polymerization process, typically to control the melt index. A CTA system includes a component able to transfer a hydrogen atom to a growing polymer molecule containing a radical, by which a radical is formed on the CTA molecule, which can then initiate a new polymer chain. CTA is also known as telogen or telomer.

The terms "CTA activity" or "chain transfer activity coefficient (Cs value)" as used herein, refer to the ratio between the "rate of chain transfer" to the "rate of ethylene propagation." See Mortimer references provided in the experimental section below.

The terms "Z1/Zi" as used herein is determined as follows. The "reactor zone molar concentration of a CTA$_j$ in a reactor zone i ([CTA]$_{ji}$)" is defined as the "total molar amount of that CTA fed (excluding a transfer from a previous reaction zone) into reactor zones k=1 to k=i" divided by the "total molar amount of ethylene fed (excluding a transfer from a previous reaction zone) into reactor zones 1 to i." Note i≥1. This relationship is shown below in Equation AC.

$$[CTA]_{ji} = \frac{\sum_{k=1}^{i} n_{CTA, j_k}}{\sum_{k=1}^{i} n_{eth_k}}. \quad \text{(Eqn. AC)}$$

In Equation AC, j≥1, $n_{CTA, j_k}$ is the "amount of moles of the jth CTA freshly injected to the kth reactor zone (where k=1 to i)," and $n_{eth_k}$ is the "amount of moles of ethylene freshly injected to the kth reactor zone (where k=1 to i)."

The "transfer activity of a CTA (system) in a reactor zone I (Zi)" is defined as the "sum of the reactor zone molar concentration of each CTA in the reactor zone" multiplied with its chain transfer activity constant (Cs)—see Equation BC. The chain transfer activity constant (Cs) is the ratio of reaction rates Ks/Kp, at a reference pressure (1360 atm) and a reference temperature (130° C.). This relationship is shown below in Equation BC, where $n_{compi}$ is the total number of CTAs in reactor zone i. Note i≥1, and $n_{compi}$≥1.

$$Z_i = \sum_{j=1}^{n_{compi}} [CTA]_{ji} \cdot C_{s,j}. \quad \text{(Eqn. BC)}$$

The chain transfer constant (Cs) values for some chain transfer agents are shown below in Table A, showing chain transfer constants (Cs) derived by Mortimer at 130° C. and 200° C., and at 1360 atm, for the shown chain transfer agents.

TABLE A

Cs-Values as Measured by Mortimer at 130° C., or 200° C., and 1360 atm, in References 1-3 and Derived Activation Energies

| Component | Cs at 130° C., 1360 atm | | Cs at 200° C., 1360 atm | | ΔEa | |
|---|---|---|---|---|---|---|
| | value | dev | value | dev | cal/mole | dev |
| Methane | 0 | ±0.0002 | | | | |
| Ethane | 0.0006 | ±0.0005 | | | | |
| Propane | 0.00302 | ±0.0003 | 0.00652 | ±0.00002 | 4200 | ±300 |
| Isobutane | 0.0072 | ±0.0003 | 0.0136 | ±0.0005 | 3500 | ±600 |
| n-Decane | 0.012 | ±0.001 | | | | |
| Propylene | 0.0122 | ±0.0008 | 0.02 | ±0.0006 | 2700 | ±800 |
| Butene-1 | 0.047 | ±0.002 | 0.057 | ±0.004 | 1100 | ±1000 |
| PA | 0.33 | ±0.01 | 0.283 | ±0.004 | −800 | nd |

The term "Rn=RZ1/RZn", as used herein, refers to, for reaction zone n, the ratio of the "mole fraction of fresh ethylene fed to the first reaction zone (RZ1)" to the "mole fraction of fresh ethylene fed to reaction zone n (RZn)."

For the polymerization of ethylene homopolymers, the RZ1 and RZn values are determined as follows—see Equations AE and BE below.

$$RZ1 = \frac{n_{fresh,eth,1}}{n_{fresh,eth,1} + n_{eth,1}}, \quad \text{(Eqn. AE)}$$

$$RZn = \frac{n_{fresh,eth,n}}{n_{fresh,eth,n} + n_{eth,n}} \quad (n \geq 2), \quad \text{(Eqn. BE)}$$

where $n_{fresh,eth,1}$ is molar flow of fresh ethylene (from Primary) fed to reaction zone 1 [mol/hr], $n_{fresh,eth,n}$ is molar flow of fresh ethylene (from Primary) fed to reaction zone n [mol/hr], $n_{eth,1}$ is molar flow of ethylene from HPR recycle fed to reaction zone 1 [mol/hr], $n_{eth,n}$ is molar flow of ethylene from HPR fed to the reaction n.

Equation AE and Equation BE, as used herein, to calculate RZ1 and RZn. Assume that 60 mol % of the overall ethylene based feed stream to the reactor is from the high pressure recycle (HPR) flow. The remainder 40 mol % of the ethylene based feed stream is from the Primary, which includes fresh ethylene and low pressure recycle (LPR) flow. Fresh ethylene is 33.3 mol %, which includes ethylene converted and lost by purge flow. Thus the Low Pressure Recycle (LPR) flow is 6.7 mol % which includes ethylene from LPR and secondary compressor gland leaks.

The term "initiator system" includes a single initiator, or a mixture of initiators, each typically dissolved in a solvent (for example, a hydrocarbon solvent) added to the polymerization process.

The term "injection point," as used herein, refers to the inlet location of a device (used in a polymerization process) where a feed stream is added into the device.

The term "feed conditions", as used herein, refers to the flows in moles of the components fed to the reactor, for instance ethylene, CTA, initiators and/or co-monomer(s).

The term "process velocity in reaction i", as used herein, is the volume flow of process or ethylene-based component divided by the cross-section area of the reactor tube, used in a reaction zone, and is calculated as follows:

$$v_i = \frac{4 \times \phi_i}{\pi d_i^2} \text{ [m/s]}, \quad \text{(Eqn. VA)}$$

where $\phi_i$ [m³/s] is the volume flow of total components (including monomer, comonomer, CTA, impurities, etc.) fed to the reaction zone i, calculated by dividing the total mass flow fed to reaction i to the density of the flow; and $d_i$ [m] is the internal tube diameter of the reactor zone i. The term "average process velocity in reaction zone i" refers to the process velocity averaged over the length of reaction zone i.

TEST METHODS

Melt Index— Melt index, or I2, is measured in accordance by ASTM D 1238, Condition 190° C./2.16 kg, and is reported in grams eluted per 10 minutes. The I10 is measured in accordance with ASTM D 1238, Condition 190° C./10 kg, reported in g/10 min.

13C NMR for Branching

Each polymer sample is prepared for 13C NMR by adding approximately 2.7 g of a 50/50 mixture of tetrachloroethane-d2/orthodichlorobenzene containing 0.025 M $Cr(AcAc)_3$ as a relaxation agent, to 0.25 g sample in a Norell 1001-7 10 mm NMR tube. The sample is dissolved and homogenized by heating the tube and its contents to 150° C. using a heating block and heat gun. The data are collected using a Bruker 400 MHz spectrometer, equipped with a Bruker Dual DUL high-temperature CryoProbe. The data are acquired using 1280 to 2560 transients per data file, a 6 sec pulse repetition delay, 90 degree flip angles, and inverse gated decoupling with a sample temperature of 120° C. All measurements are made on non-spinning samples in locked mode. Samples are allowed to thermally equilibrate for seven minutes prior to data acquisition. The $^{13}C$ NMR chemical shifts are internally referenced to the EEE triad at 30.0 ppm.

LDPE contains many types of branches; for example, 1,3-diethyl, ethyl branches on a quaternary carbon (gem diethyls), C4, C5 and longer, and if butene or propylene is used, isolated C2 branches (from butene) or C1 (methyl, from propylene) branches are observed. All branching levels are determined by integrating the spectrum from about 40 ppm to 5 ppm, and setting the integral value to 1000, then integrating the peaks associated with each branch type, as shown in the Table A below. The peak integrals then represent the number of each branch type per 1000C in the polymer. The last column in Table A describes the carbon associated with each integral range. A direct measurement of C6+ branches in LDPE is given, where the long branches are not distinguished from "chain ends". This value represents a level of branching which is defined differently than in LLDPE, HDPE, and other linear polymers. The 32.2 ppm peak, representing the 3rd carbon from the end of all chains or branches of 6 or more carbons is used. In order to derive the number of C6+ branches by the long chain branching mechanism, the measured C6+ number has to be corrected for the presence of both end-groups of the main backbone in the LDPE molecules and the potential use of alpha-olefins with carbon numbers ≥8.

TABLE A

Branching Type and 13C NMR integral ranges used for quantitation

| Branch Type | Peak(s) integrated | Identity of the integrated carbon peak(s) |
| --- | --- | --- |
| 1,3 diethyl | about 10.5 to 11.5 ppm | 1,3 diethyl branch methyls |
| C2 on quaternary carbon | about 7.5 to 8.5 ppm | 2 ethyl branches on a quaternary carbon, methyls |
| C1 | about 19.75 to 20.50 ppm | C1, methyls |
| C4 | about 23.3 to 23.5 ppm | Second $CH_2$ in a 4-carbon branch, counting the methyl as the first C |
| C5 | about 32.60 to 32.80 ppm | Third $CH_2$ in a 5-carbon branch, counting the methyl as the first C |
| C6 or longer (or C6+) | About 32.1 to 32.3 ppm | The third $CH_2$ in any branch of 6 or more carbons in length |

EXPERIMENTAL

Flow Scheme used for CP1, CP1.1, CP2 and CP3

FIG. 1 shows a generalized flow scheme of a simulated, high pressure polymerization reactor system containing a tubular reactor, where all components from a hyper compressor are sent to the first (front) reaction zone of the reactor, representing "All Front Gas" reactor configuration. Stream (1) is the fresh ethylene make-up, which is compressed together with the outlet of the Booster by the Primary to stream (2). Stream (2) is combined with high pressure recycle stream (18) to form stream (3), and sent to the inlet of the secondary compressor system (Hyper). The secondary compressor system pressurizes the ethylene feed stream to a level sufficient to feed the high pressure tubular reactor (Reactor). Stream (4), depicting the CTA system make-up (fresh) feed in this reactor configuration, could be fed in the inlet(s), interstage or outlet of the secondary compressor system. The CTA system can consist of either a single or multiple components, and can include varying compositions. Stream (6) represents an optional comonomer feed which can be fed in the inlet(s), interstage(s), outlet(s) of the secondary compressor system. The discharge temperature of the secondary compressor system is typically between 60 and 100° C. The ethylene feed to the first reaction zone is typically preheated to a temperature from 130 to 180° C.

In the reactor, the polymerization is initiated with the help of a free radical initiation system(s) injected, and/or activated, at the inlet of each reaction zone. The maximum temperature in each reaction zone is controlled at a set point, by regulating the concentration and/or feed amount of initiation system at the start of each reaction zone. After finishing the reaction, and having applied multiple cooling steps, the reaction mixture is depressurized and/or cooled in (10), and separated in the high pressure separator (HPS). The HPS separates the reaction mixture into an ethylene rich stream (15), containing minor amounts of waxes and/or entrained polymer, and a polymer rich stream (11), which is sent to the low pressure separator (LPS) for further separation. Ethylene stream (15) is cooled and cleaned in stream (17). Stream (16) is a purge stream to remove impurities and/or inerts.

The polymer separated in LPS is further processed in (12). The ethylene removed in the LPS is fed to the Booster (see stream (13)), where, during the compression, condensables such as solvent, lubrication oil, and others components, are collected and removed through stream (14). The outlet of the Booster is combined with make-up ethylene stream (1), and further compressed by the Primary.

Flow Scheme of CP4 Through CP7, IP4.1 Through IP4.2, IP4.5, IP5.1, IP6.1 and IP7.1

Figure 2:
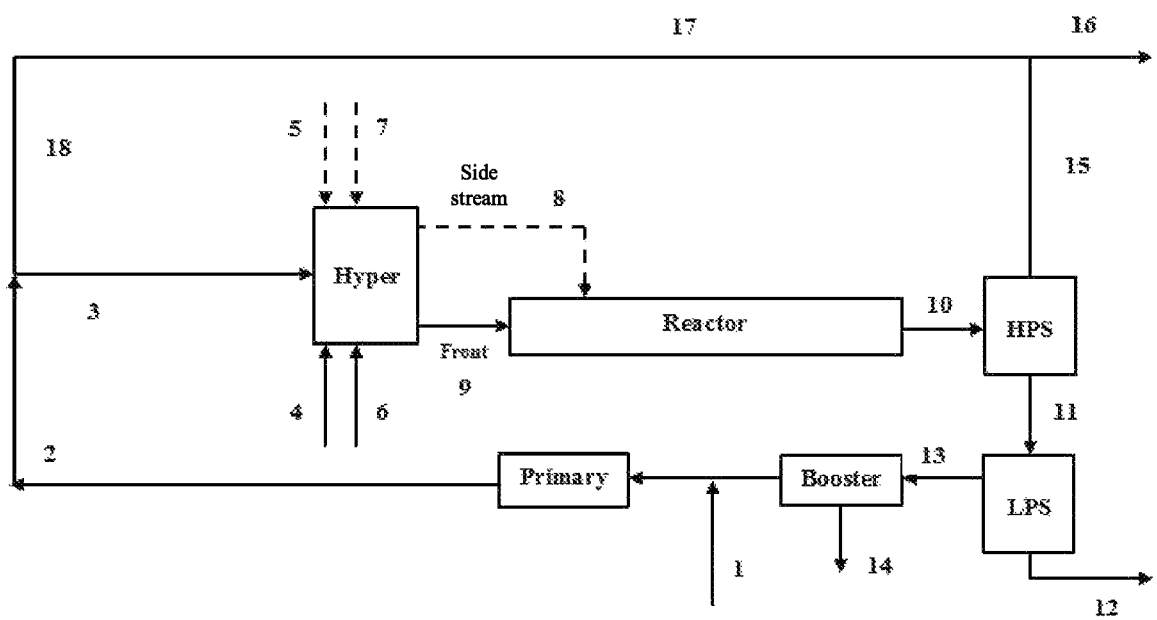
FIG. 2 depicts a polymerization flow diagram containing a tubular reactor for polymerizations CP4 through CP7, IP4.1, IP4.2, IP4.5, IP5.1, IP6.1 and IP7.1.

FIG. 2 shows a generalized flow scheme of a simulated, high pressure polymerization reactor system containing a tubular reactor. HPR (stream 17) is combined with the primary flow (stream 2) to form stream (3) which is fed to the suction of the secondary compressor. In these operations a part of the discharge flow from the secondary compressor system is sent to the first (front) reaction zone of the reactor (stream 9), and the remaining flow (stream 8) is sent as a side stream reaction zone located downstream from the first reaction zone.

Stream (4) and/or (5) depict the CTA system make-up (fresh) feed. The CTA make-up can, in principle, be freely distributed over the main compression streams fed and/or distributed over the side stream (8) and front stream (9). CTA make-up streams (4) and/or (5) can be fed in the inlet(s), interstage(s), outlet(s) of the secondary compressor system, and/or inlet(s) of the reaction zones. The co-monomer flow can be fed to the suction of the secondary compressor system via stream 6 and/or 7. All other remaining parts of the reactor system are described above for FIG. 1.

Flow Scheme of IP4.3, IP4.4, IP5.2, IP6.2 and IP7.2

Figure 3:
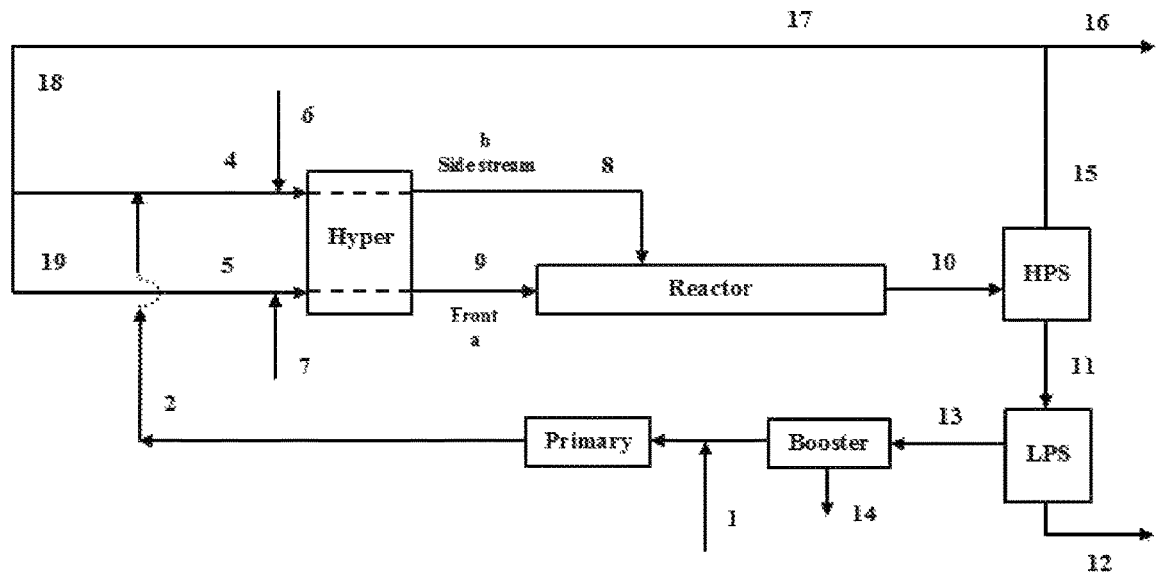
FIG. 3 depicts a polymerization diagram containing a tubular reactor for polymerizations IP4.3, IP4.4, IP5.2, IP6.2 and IP7.2.

FIG. 3 shows the simulated high pressure polymerization reactor system that is used for the IP4.2, IP4.3, IP5.2, IP6.3, IP7.2 and IP8.2. The HPR (stream 17) split up into stream (18) and stream (19). Make-up CTA (stream 6 and/or 7) and/or comonomer are added through streams 6 and/or 7 to the stream (18) and (19) before feeding to the suction of the Hyper, but can be optionally fed to the interstage and/or discharge of the secondary compressor system. A part of ethylene-based stream after the Hyper is sent to the front of the reactor (stream 9), while the remaining ethylene-based stream (stream 4) is sent to the side as stream (8), located downstream from the first reaction zone. Stream (18) is combined with the Primary (stream 2) and fed as stream (4) to the Hyper. In IP4.3, fresh (make-up) ethylene is only fed to the side of the reactor and CTA is evenly distributed over the front and side of the reactor, which is called "fresh ethylene distribution". In IP4.4, IP5.2, IP6.2 and IP7.2, fresh ethylene is fed to the side of the reactor while all fresh (make-up) CTA is injected to the front of the reactor, so called "combined fresh ethylene and front CTA operation". All other parts of the reactor system are described above for FIG. 1.

Polymerization Simulations

A polymerization simulation model with applied reaction scheme and kinetics is described by Goto et al. (Goto et al; Journal of Applied Polymer Science: Applied Polymer Symposium, 36, 21-40, 1981 (Title: Computer model for commercial high pressure polyethylene reactor based on elementary reaction rates obtained experimentally. Other reactor and product modeling frameworks are available through ASPEN PLUS of Aspen Technology, Inc., Burlington, Mass., USA; and PREDICI of Dr. Wulkow, Computing in Technology GmbH (CiT), Rastede, Germany. Process and product responses predicted by these model frameworks are determined by the reactor parameters, the applied reaction scheme, and kinetic parameters. The applied reaction scheme and kinetic parameters are described below. The polymerization simulations were achieved with Goto LDPE simulation model, as discussed above. The kinetic data used by Goto et al. was derived from high pressure, free radical polyethylene polymerization experiments, performed at varying temperature, pressure and polymer concentration, as described in the following references: K Yamamoto, M. Sugimoto; *Rate constant for long chain-chain branch formation in free-radical polymerization of ethylene; J. Macromol. Science-Chem.*, A13 (8), pp. 1067-1080 (1979). The elementary reaction steps are described by Goto et al. as follows: i) propagation of ethylene, ii) termination of radicals, iii) backbiting or SCB formation, iv) transfer to polymer or LCB formation, v) beta elimination of secondary radicals leading to vinyl formation, and vi) beta elimination of tertiary radicals leading to vinylidene formation.

Kinetic data for main reactions are shown in Table 1, where ko is the pre-exponential or frequency factor; Ea is the activation energy, reflecting the temperature dependence; and $\Delta V$ is the activation volume, reflecting the pressure dependence. All kinetic constants are from Goto et al., except the ko, Ea and $\Delta V$ values for backbiting, which have been optimized to better reflect the level of methyl branches (as analyzed by C13 NMR technique) in high pressure polyethylene, as a function of pressure and temperature conditions.

TABLE 1

Kinetic Constants for Main Reactions

| | Reaction | | |
|---|---|---|---|
| | ko | Ea | $\Delta V$ |
| | Units | | |
| | m³/hr/kmol | cal/mol | cc/mol |
| Propagation | 5.63E+11 | 10520 | −19.7 |
| Termination | 3E+11 | 3000 | 13 |
| Backbiting | 2.6E+12 | 12130 | −14 |
| Transfer to Polymer | 1.75E+12 | 14080 | 4.4 |
| Beta Elimination of sec rad | 5.82E+11 | 15760 | −22.6 |
| Beta Elimination of tert rad | 8.51E+10 | 14530 | −19.7 |

In a high pressure (inlet pressure ≥100 MPa), free-radical polymerization, branching can be formed by the following predominant reactions: a) back-biting reactions, which are intramolecular reactions, leading to ethyl and butyl branches, b) reactions that incorporate alpha-olefins into the polymer molecule, and such alpha-olefins being used as chain transfer agents (for example; propylene, 1-butene, etc.); c) reactions involving transfer to polymer resulting in a polymer branch with a carbon length that depends on the number of ethylene insertions before this branch is terminated. For example, the intermolecular hydrogen transfer leads to the termination of a growing polymer molecule, and the reactivation of a "dead" or inactive polymer molecule. For reactions involving the transfer to polymer ("c" above), theoretically, this reaction could lead to branch length varying from ethyl and butyl branches up to 1000 carbons and more. The formation of ethyl and butyl branches by this reaction only occur at a very low and insignificant level, typically less than 0.1 per 1000 carbons. A long chain branch is formed from the intermolecular hydrogen transfer ("c" above), and leads to a broadening of the molecular weight distribution of the final polymer. For reactions under "b" above, the incorporation of an alpha-olefin does not result in the broadening of the molecular weight distribution of the final polymer. 13C NMR can be used to measure the level of long chain branching (LCB), defined as C6 or higher; however, corrections to the NMR spectrum can be made for the presence of any alpha-olefin (CTA) with a carbon number of eight or more, by comparing the spectra of polymer samples made with and without the presence of the higher alpha-olefin. The kinetics developed by Goto et al., and Yamamoto et al. focus on the relationship of process conditions, such as temperature, pressure and polymer concentration (expressed as incorporated ethylene units), on the kinetic parameters of the intermolecular hydrogen transfer ("transfer to polymer") and the impact of the level of intermolecular hydrogen transfer on the molecular weight distribution of the final polymer.

The kinetic data for selected CTAs is given in Table 2. The kinetic constants haven been calculated with the help of the kinetic constants on the Cs-value (ks/kp) as determined by Mortimer (see References below), and the ethylene propagation kinetics as given by Goto et al. (see Table 1).

TABLE 2

Kinetic Constants for Selected CTAs

| | Chain Transfer to Modifier | | | Reactivity Ratios | |
|---|---|---|---|---|---|
| Component | kao m3/ hr/kgmol | Ea cal/mol | $\Delta V$ cc/mol | $r_1$ ($k_{11}/k_{12}$) | $r_2$ ($k_{22}/k_{21}$) |
| Propylene (CTA) | 2.20E+11 | 13220 | −16.7 | 3.10 | 0.77 |
| Propionaldehyde (CTA) | 1.07E+11 | 9720 | −8.4 | 0.00 | 0.00 |
| Isobutane (CTA) | 3.51E+11 | 14020 | −16.7 | 0.00 | 0.00 |

Propylene will beside of its CTA functionality also act as a comonomer, resulting in additional methyl branches. These additional methyl branches will lower the density of the polymer by 0.001 to 0.004 g/cc. Furthermore the comonomer activity will increase the consumption level per reactor pass, by which more propylene has to be added to compensate for the consumption as CTA as well as comonomer.

References:

General: G. Luft, *Chem.-Ing.-Tech., Hochdruck-Polyaethylen*, Vol. 51 (1979) Nr. 10, pages 960-969. Peroxide efficiency: T. van der Molen et al., *Ing. Chim. Ital, "Light-off" temperature and consumption of 16 initiators in LDPE production*, Vol. 18, N. 1-2, February 1982, pages 7-15. Chain transfer activity and comonomer reactivity scheme data are described in the following: P. Ehrlich, G. A. Mortimer, *Fundamentals of the free radical polymerization of ethylene*, Adv. Polymer Sci., Vol. 7, 386-448 (1970); G. Mortimer, Journal of Polymer Science: Part A-1; *Chain transfer in ethylene polymerization;* Vol. 4, p 881-900 (1966); G. Mortimer, Journal of Polymer Science: Part A-1, *Chain transfer in ethylene polymerization. Part IV. Additional study at 1360 atm and 130° C.;* Vol. 8, p 1513-1523 (1970); G. Mortimer, Journal of Polymer Science: Part A-1, *Chain transfer in ethylene polymerization. Part V. The effect of temperature;* Vol. 8, p 1535-1542 (1970); G. Mortimer, Journal of Polymer Science: Part A-1, *Chain transfer in* ethylene polymerization Part V. The effect of pressure, Vol. 8, p 1543-1548 (1970); and G. Mortimer, Journal of Polymer Science: Part A-1, Chain transfer in ethylene polymerization VII. Very reactive and depletable transfer agents, Vol. 10, p 163-168 (1972). See LDPE simulation model in S. Goto et al., Journal of Applied Polymer Science: Applied Polymer Symposium, 36, 21-40, 1981 (Title: Computer model for commercial high pressure polyethylene reactor based on elementary reaction rates obtained experimentally).

Initiator System

Table 3 shows that temperature and pressure have a significant influence, via the activation energy (Ea) and activation volume ($\Delta V$), on propagation rates and radical termination rates. Peroxide efficiency is affected by the ratio $K_p/K_t^{1/2}$, and will therefore increase with higher temperature and/or higher pressure, and will decrease with lower temperature and/or lower pressure. For instance, Theo van der Molen et al. (see above References) show, in their article "Light-off temperature and consumption of 16 initiators in LDPE production," that the consumption of initiators to reach a certain temperature level, in a high pressure LDPE reactor, is strongly affected by the operating pressure. Thus lowering operating pressure, without increasing the amount of initiator system, will lead to lower maximum zone or peak temperature(s) and lower monomer conversion level, for a given reactor system and vice versa.

TABLE 3

Half-life Temperature at Different Time of Each Organic Peroxide*

| Classification | Initiator system | Chemical name | Half-life temperature [° C.] 0.1 [hr] |
|---|---|---|---|
| Class 1 | TRIGONOX 25 | Tert-Butyl peroxypivalate | 94 |
|  | TRIGONOX 21 | Tert-Butyl peroxy-2-ethylhexanoate | 113 |
| Class 2 | TRIGONOX F | Tert-Butyl peroxyacetate | 139 |
|  | TRIGONOX 201 | Di-tert-amyl peroxide | 150 |
| Class 3 | TRIGONOX 101 | 2,5-Dimethyl-2,5-di(tert-butylperoxyl)hexane | 156 |
|  | TRIGONOX T | Tert-Butyl cumyl peroxide | 159 |
|  | TRIGONOX B | Di-tert-butyl peroxide | 164 |
|  | TRIGONOX 145-E85 |  | 164 |

*AkzoNobel Brochure.

Detail of Tubular Reactor Simulations

Table 4 presents the reactor configurations and process conditions for inventive and comparative polymerizations. The CTA types used for all simulations, to control melt index, have a activity (Cs) varying from 0.01 to 0.33. The melt index of polymers used in the simulations are varying from 1 to 10, but can easily be extended to a wider range. The polymerizations are simulated for a high pressure tubular reactor operating typically at a reactor inlet pressure of 280 MPa (2800 bar), using an ethylene-based throughput of 60 metric tons/hr. The ethylene based flow coming from the hyper compressor is split by 100/0/0/0 (CP1, CP1.1, CP2 and CP3), or 50/50/0/0 (CP4, CP5 and IP4.1 through IP4.5, IP5.1 and IP5.2) or 75/25/0/0 (CP6, CP7, IP6.1, IP6.2, IP7.1 and IP7.2), which indicates that the ethylene-based stream is completely sent to the front, as in 100/0/0/0/., or partly distributed over both front and side of the reactor, as in 50/50/0/0 and 75/25/0/0. A tubular reactor configuration comprises up to several thousand meters of total length, for four or more reaction zones. In the simulations, the reactor length is varied from 1300 to 1500 meter, depending on the reactor configuration. The inside diameters of the reactor tubes are varied from 38 mm to 54 mm, for the first reaction zone, and from 38 mm to 54 mm, for the remaining part of the reactor. The reactor dimensions are selected to maintain a good average process velocity in the range of 12 to 14 m/s of the reaction zone i, thus providing a good flow regime for mixing, heat transfer as well as acceptable pressure drop in and over the reactor. The pressure drop over the reactor is around 500 Bar for all simulations.

Initiator systems comprising a mixture of initiators are injected into the reactor at different locations, to create multiple reaction zones, and thus creating a four peak temp. profiles and elevating the overall conversion. The half-life time of each peroxide is been listed in Table 3. Typically mixtures of Tert Butyl peroxy-2-ethylhexanoate (TBPO) and Di-tert-butyl peroxide (DTBP) have been used; however with low start and/or re-initiation temperatures Tert Butyl peroxypivalate (TBPIV) was added or in case of lower peak temperature, 270 Deg C. or lower, DTBP was replaced by Tert Butyl peracetate (TBPA).

The water temperatures, for cooling or heating the reaction zones, are operated with an inlet temperature of 155° C. in a counter current mode. Alternatively the water temperatures can be operated at other uniform or non-uniform settings. The cooling zones can be operated in a co- and/or countercurrent mode.

The simulations have been done with an inlet temperature of the first reaction zone of 150° C. Propionaldehyde (PA) and iso-butane are used as a Chain Transfer Agent (CTA), which have activities (Cs) of 0.33 and 0.01, respectively, and a conversion/make up of around 10% and 1%, respectively, per reactor pass.

Long Chain Branching at the First 40 wt % Polymer Formed and at the Last 60 wt % Polymer Formed The term "long chain branching frequency (LCBf)" used herein refers to the ratio, described below, relating to the transfer to polymer steps, leading to long chain branches per 1000 C-atoms (or 500 ethylene units) converted in polyethylene. Typically LCBf is the average number of the whole polymer. This ratio can be determined via NMR or be calculated via simulations. The numbers used herein are derived by simulations. The LCBf derived by simulations is the ratio of transfer to polymer reaction $R_{LCB}$ rate and the propagation rate $R_p$, and multiplied the ratio by 500. $R_{LCB}=k_{LCB}*[Rad]*[Pol]$ and $R_p=k_p*[Rad]*[Ethylene]$. The ratio $R_{LCB}/R_p$ only would indicate the frequency of LCB-formation per one ethylene unit converted. To derive the total LCBf of the whole polymer, the ratio has to be integrated over the temperature, pressure and conversion and polymer formation profiles of the used reactor. This is typically done in a simulation software like Predici by CiT or similar programs, which are able to solve differential equations.

LCB content is obtained from the polymerization simulation model based on the Mitsubishi Petrochemical Co., Ltd. (MPCL) model, and described by Goto (Goto et al., Journal of Applied Polymer Science: Applied Polymer Symposium, 36, 21-40 (1981), which can be extracted along the length of the reactor from the output of the process simulation. The LCBf at the first 40 wt % of polymer formed ($LCBf_{40\%}$) is derived (for example, using a linear interpolation) at the position of 40 wt % polymer over the total cumulative polymer produced (total polymer produced at the outlet of the reactor).

The amount of polymer at the position that 40 wt % of the total polymer ($M_{P40\%}$) is shown in Eqn. 1 below.

$M_{P40\%} = M_{Ptotal} \times 0.4$ [kg/hr] (Eqn. 1), where $M_{p\ total}$ is the total amount of cumulative polymer produced at the end (outlet) of the reactor. The LCB at this position is determined from the process simulation output and considered at the $LCB_{40\%}$.

LCB at the remaining 60 wt % polymer is calculated via (Eqn.2) below.

$$LCBf_{60\%} = \frac{LCBf_{finalpolymer} - 0.4 \times LCBf_{40\%}}{0.6} \quad [1/1000\ C]. \qquad (\text{Eqn. 2})$$

The ratio's between the first $LCB_{40\%}$ over the total polymer and $LCB_{60\%}$ over $LCB_{40\%}$ are simplified in (Eqn. 3) and (eqn. 4) below.

$$R_{LCBf40\%} = \frac{LCBf_{40\%}}{LCB_{ffinalpolymer}} \times 100\%\ [\%], \qquad (\text{Eqn. 3})$$

$$R_{\frac{LCBf60\%}{LCBf40}}\% = \frac{LCBf_{60\%}}{LCBf_{40\%}}\ [\%]. \qquad (\text{Eqn. 4})$$

Example for calculation of $LCB_{40\%}$ (done for IP4.1 case) The process simulation outputs (Goto kinetics—see Table 1) at the reactor position where different wt % s of polymer are formed: the 37.2% of wt polymer formed ($P_{37.2\%}$) has a LCB of 0.576/1000C; the 42.1% of wt polymer formed ($P_{42.1\%}$) has a LCB of 0.673/1000C.

$LCBf_{40\%} =$
$\frac{40\% - 37.2\%}{42.1\% - 37.2\%} \times (0.673/1000\ C - 0.576/1000\ C) + 0.576/1000\ C =$
$0.63/1000\ C$;

$R_{LCBf40\%} = \frac{LCBf_{40\%}}{LCBf_{final}} \times 100\% = \frac{0.63/1000\ C}{3.07/1000\ C} = 20.58\%$;

$LCB_{60\%} = \frac{LCBf_{final} - 0.4 \times LCBf_{40\%}}{0.6} =$ $\frac{3.07/1000\ C - 0.4 \times 0.63/1000\ C}{0.6} = 4.69/1000\ C$;

$R_{\frac{LCBf60\%}{LCBf40\%}} = \frac{4.69/1000\ C}{0.63/1000\ C} = 7.45.$

Normalized Molecular Weight Distribution (MWD)

Molecular Weight Distribution (representing the relationship between (dw/dlogM) and log M) is an important parameter used in the polymerization designs, process development, improvement and operation. It is necessary to determine the types of polymer produced (narrow or broad MWD) which provide the desired product properties. Normalized MWD data can be obtained by using PREDICI commercial software package (licensed by Dr. M. Wulkow, Computing in Technology, GmbH, Pater-Klbe-Straße 7, D-26180 Rastede, Germany), to construct MWD from polymerization kinetics (Goto kinetics in this study), through solving polymer population balance equations. The required inputs for PREDICI are the used Goto kinetics, and the monomer and/or co-monomer, initiator and CTA flows, temperature and pressure profiles, as well as elapsed time, all of which can be obtained from the process simulation. PREDICI software package can be used to generate normalized MWD data.

The MWD of each polymer has been calculated and subsequently normalized with the MWD of CP1 (comparative—100/0/0/0), following (Eqn.5):

$$MWD_{normalized} = \frac{MWD_{example}}{MWD_{CP1}} \times 100\%. \qquad (\text{Eqn. 5})$$

Comparative Polymerizations for Tubular Reactor: CP1, CP1.1 and CP2 Through CP7

The simulations of CP1, CP1.1, CP2 and CP3 have been done for the reactor configuration 100/0/0/0 (where the ethylene-based feed stream is fully sent to the first reaction zone). The inner tube diameter of the reactor is of 54 mm, giving an average process velocity of 13.6 m/s over the whole reactor length. In all the simulations, the reactor inlet pressure and the overall conversion level are maintained at respectively 2800 bar and at 31.9%, 33.9% or 31.4% (depending on MI and/or CTA type). The conversion level is maintained at target level by adjusting the last peak temperatures in CP1.1. The CTA's with different activities have been simulated, namely Cs=0.33 and Cs=0.01. These CTAs were simulated with overall conversion or make-up levels of respectively 10% and 1%. Most simulations were carried out for products with a melt-index of 1 g/10 min, except of CP2 which was simulated for a product melt index of 10 g/10 min. For CP1, CP1.1, CP2 and CP3, all CTA, make-up and recycled, is fed to the first reaction zone. The ethylene conversions in the comparative and inventive examples are respectively 31.9% (1 MI, Cs=0.33), 34.3% (10 MI, Cs=0.33) and 31.7% (1 MI, Cs=0.01). More details can be found in Table 4 and Table 5.

In the CP1, ethylene is polymerized with high peak temperatures of 290, 290, 290 and 290° C. in the four reaction zones resulting in a LCB content of 3.13/1000C in the final product. The $LCBf_{40\%}$ content is of 0.79/1000C, giving a $R_{LCBf\ 40\%}$ of 25.3%. The normalized Molecular Weight Distribution (MWD) is 100%, namely $$MWD_{normalized} = \frac{MWD_{CP1}}{MWD_{CP1}} \times 100\% = 100\%.$$

Figure 4:
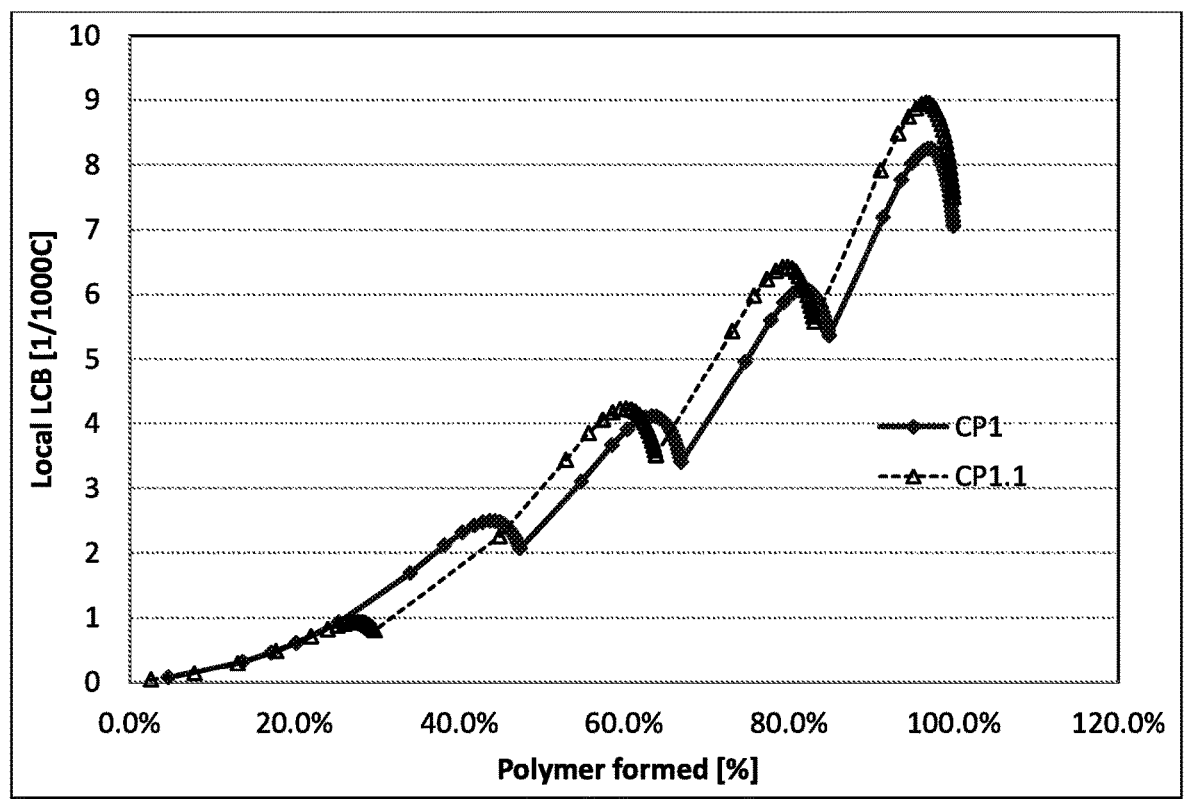
FIG. 4 depicts the "local Long Chain Branching (LCB) level versus wt % polymer formed," for polymerizations CP1 and CP1.1.

The MWD of CP1 is used to calculate the normalize MWD values reported in Table 2. In the CP1.1 the polymerization is carried with the first peak temperature of 240° C., while the remaining peaks are increased to 302/302/302° C., to reach the target conversion level of the CP1. It is interesting to note that the first 40% polymer is produced at a significant lower $LCBf_{40\%}$ of 19.8% versus 25.3% for the corresponding CP1. The remaining 60% polymer in CP1.1 has a therefore a higher $LCBf_{60\%}$ since the overall LCB level is increased. This results in a broader MWD (103% vs. 100%). FIG. 4 shows the developments of LCB level in locally formed polymer along the reactor length.

The effect of melt index (10 MI) and CTA activity (Cs=0.01) on the polymer properties is covered in CP2 and CP3. It is clearly shown that higher MI narrows the MWD (CP2 example has a normalized MWD of 82%), while much broader MWD polymer is obtained with operating with a low activity CTA (CP3 example has a normalized MWD of 160%).

CP4 through CP7 examples represent the high pressure tubular polymerization with front and side of ethylene-based feed stream. In CP6 and CP7 75 mole % of the ethylene based feed flow is sent to the front, while 25 mole % is sent to the side of the reactor, while the CTA (make-up and recycled) is pro ratio with the ethylene feed flows distributed over the reaction zones resulting in equal feed concentration along the reactor. In the comparative cases the high peak temperatures have been applied for all reaction zones (290, 290, 290 and 290° C.). The reactor length has been chosen to obtain/match 31.9% conversion (for Cs=0.33 and 1 MI), 31.7% (for Cs=0.01 and 1 MI) or 34.3% (for Cs=0.33 and 10 MI). It should be noted that due to the different flow distribution over the reactor, the tube diameter and the length of the reactor have been readjusted for each case to maintain an average process velocity of around 13 msec in order to maintain a good flow regime and heat transfer.

A similar approach has been applied for the CP4 and CP5 examples with the reactor configuration of 50/50/0/0. In these examples the fresh ethylene coming from the primary compressor and the recycled ethylene coming from the HPR is equally distributed over both feed streams resulting in even CTA feed concentration along the reactor. From the normalized MWD values of CP1, CP4 and CP6 can be concluded that while maintaining the same process conditions such as conversion level, pressure and peak temperatures, distributing the ethylene feed stream increasingly over the side feed stream broadens the MWD. This trend in normalized MWD is not supported by the LCB level in the final polymer or by the $LCBf_{40\%}$ values. Again increasing melt index narrows the MWD see CP5. The detail properties of simulated polymers are reported in Table 6.

TABLE 4

Process configurations and operating conditions

| Ethylene feed distribution mol %[A] | Example | CI temperature [° C.] | Peak temperature [° C.] | Start/re-initiation temp [° C.] | Conversion [%] | Reactor inlet Pressure [bar] | Hyper throughput [Mt/hr] | Tube diameter [mm] | Reactor length [m] |
|---|---|---|---|---|---|---|---|---|---|
| 100/0/0/0 | CP1 | NA | 290/290/290/290 | 150/251/256/262 | 31.9 | 2800 | 60 | 54/54/54/54 | 374/323/374/337 (total length 1408) |
| | CP1.1 | NA | 240/302/302/302 | 150/211/263/270 | 31.9 | 2800 | | | |
| | CP2 | NA | 290/290/290/290 | 150/244/246/253 | 31.9 | 2800 | | | |
| | CP3 | NA | 290/290/290/290 | 150/255/253/261 | 31.9 | 2800 | | | |
| 50/50/0/0 | CP4 | 40 | 290/290/290/290 | 150/156/253/258 | 31.9 | 2800 | 60 | 38/54/54/54 | 136/408/391/337 (total length 1272) |
| | IP4.1(*) | 40 | 255/293/293/293 | 150/145/257/259 | 31.9 | 2800 | | | |
| | IP4.2 | 40 | 240/295/295/295 | 150/140/259/261 | 31.9 | 2800 | | | |
| | IP4.3(**) | 40 | 240/294/294/294 | 150/140/257/260 | 31.9 | 2800 | | | |
| | IP4.4(***) | 40 | 240/294/294/294 | 150/140/257/260 | 31.9 | 2800 | | | |
| | IP4.5 | 80 | 240/298/298/298 | 150/160/254/263 | 31.9 | 2800 | | | |
| | CP5 | 40 | 290/290/290/290 | 150/166/243/248 | 34.3 | 2800 | | | |
| | IP5.1 | 40 | 240/295/295/295 | 150/140/248/251 | 34.3 | 2800 | | | |
| | IP5.2(***) | 40 | 240/294/294/294 | 150/140/257/260 | 34.3 | 2800 | | | |
| 75/25/0/0 | CP6 | 40 | 290/290/290/290 | 150/226/240/257 | 31.9 | 2800 | 60 | 47/54/54/54 | 170/408/459/337 (total length 1374) |
| | IP6.1 | 40 | 240/297/297/297 | 150/189/253/260 | 31.9 | 2800 | | | |
| | IP6.2(***) | 40 | 240/296/296/296 | 150/189/252/260 | 31.9 | 2800 | | | |
| | CP7 | 40 | 290/290/290/290 | 150/226/239/256 | 31.7 | 2800 | | | |
| | IP7.1 | 40 | 240/297/297/297 | 150/185/252/261 | 31.7 | 2800 | | | |
| | IP7.2(***) | 40 | 240/296/296/296 | 150/185/252/259 | 31.7 | 2800 | | | |

(*) Claim boundary;
(**) Fresh ethylene distribution to the side only;
(***) Fresh CTA distribution to the front, and fresh ethylene distribution to the side;
[A]mole % of ethylene plus CTA fed to each noted polymerization zone(s), and each mole percent based on the total moles of ethylene and CTA fed to the polymerization. The first percentage represents the mole % of ethylene plus CTA fed to the first reaction zone.

TABLE 5

Chain Transfer Agent and Ethylene Distribution to each Reaction Zone

| Ethylene feed distribution mol % | Example | MI g/10 min | CTA activity (Cs) | RZ1 | RZ2 | R2 | Z1/Z2[B] |
|---|---|---|---|---|---|---|---|
| 100/0/0/0 | CP1 | 1 | 0.33 | 0.333 | NA | NA | 1 |
| | CP1.1 | 1 | 0.33 | 0.333 | NA | NA | 1 |
| | CP2 | 10 | 0.33 | 0.333 | NA | NA | 1 |
| | CP3 | 1 | 0.01 | 0.333 | NA | NA | 1 |
| 50/50/0/0 | CP4 | 1 | 0.33 | 0.333 | 0.333 | 1 | 1 |
| | IP4.1(*) | 1 | 0.33 | 0.333 | 0.333 | 1 | 1 |
| | IP4.2 | 1 | 0.33 | 0.333 | 0.333 | 1 | 1 |
| | IP4.3(**) | 1 | 0.33 | 0 | 0.667 | 0 | 1.45 |
| | IP4.4(***) | 1 | 0.33 | 0 | 0.667 | 0 | 1.55 |
| | IP4.5 | 1 | 0.33 | 0.333 | 0.333 | 1 | 1 |
| | CP5 | 10 | 0.33 | 0.333 | 0.333 | 1 | 1 |
| | IP5.1 | 10 | 0.33 | 0.333 | 0.333 | 1 | 1 |
| | IP5.2(***) | 10 | 0.33 | 0 | 0.667 | 0 | 1.55 |
| 75/25/0/0 | CP6 | 1 | 0.33 | 0.333 | 0.333 | 1 | 1 |
| | IP6.1 | 1 | 0.33 | 0.333 | 0.333 | 1 | 1 |
| | IP6.2(***) | 1 | 0.33 | 0.157 | 0.833 | 0.188 | 1.30 |
| | CP7 | 1 | 0.01 | 0.333 | 0.333 | 1 | 1 |
| | IP7.1 | 1 | 0.01 | 0.333 | 0.333 | 1 | 1 |
| | IP7.2(***) | 1 | 0.01 | 0.157 | 0.833 | 0.188 | 1.31 |

[B]Z1/Z2 is the ratio of the activity of the CTA system in the first ethylene feed (Z1) to the activity of the CTA system in the second ethylene feed (Z2).

TABLE 6

Properties of Simulated Polymers

| Ethylene feed distribution mole % | Example | SCB [1/1000 C] | Final LCBf [1/1000 C] | Mw/Mn | Normalized Mw/Mn [%] | LCBf$_{40\%}$ 1/1000 C | LCBf$_{60\%}$ 1/1000 C | R$_{LCBf\,40\%}$ × 100 % | R$_{LCB60f\%/LCBf40\%}$ |
|---|---|---|---|---|---|---|---|---|---|
| 100/0/0/0 | CP1 | 22.91 | 3.13 | 8.05 | 100 | 0.79 | 4.68 | 25.32 | 5.92 |
|  | CP1.1 | 23.06 | 3.32 | 8.33 | 103 | 0.66 | 5.10 | 19.78 | 7.76 |
|  | CP2 | 23.58 | 3.89 | 6.62 | 82 | 0.67 | 6.03 | 17.35 | 8.94 |
|  | CP3 | 24.00 | 3.23 | 12.90 | 160 | 0.81 | 4.84 | 25.07 | 5.98 |
| 50/50/0/0 | CP4 | 22.47 | 3.10 | 9.61 | 119 | 0.91 | 4.56 | 29.26 | 5.03 |
|  | IP4.1 | 22.08 | 3.21 | 8.33 | 103 | 0.63 | 4.69 | 20.55 | 7.45 |
|  | IP4.2 | 22.09 | 3.10 | 8.24 | 102 | 0.58 | 4.78 | 18.79 | 8.20 |
|  | IP4.3 | 22.01 | 3.07 | 6.70 | 83 | 0.58 | 4.73 | 18.96 | 8.12 |
|  | IP4.4 | 22.00 | 3.07 | 6.44 | 80 | 0.58 | 4.73 | 18.97 | 8.12 |
|  | IP4.5 | 22.69 | 3.21 | 9.11 | 113 | 0.68 | 4.90 | 21.08 | 7.24 |
|  | CP5 | 22.79 | 3.35 | 7.66 | 95 | 0.962 | 4.94 | 28.74 | 5.13 |
|  | IP5.1 | 22.47 | 3.36 | 6.71 | 83 | 0.662 | 5.17 | 19.69 | 7.80 |
|  | IP5.2 | 22.43 | 3.35 | 5.19 | 64 | 0.662 | 5.14 | 19.79 | 7.76 |
| 75/25/0/0 | CP6 | 22.98 | 3.15 | 9.24 | 115 | 1.14 | 4.48 | 36.35 | 3.92 |
|  | IP6.1 | 22.72 | 3.18 | 8.69 | 108 | 0.68 | 4.84 | 21.41 | 7.12 |
|  | IP6.2 | 22.64 | 3.16 | 7.34 | 91 | 0.67 | 4.81 | 21.35 | 7.14 |
|  | CP7 | 24.07 | 3.26 | 14.95 | 186 | 1.20 | 4.63 | 36.83 | 3.86 |
|  | IP7.1 | 23.83 | 3.30 | 14.13 | 176 | 0.69 | 5.01 | 21.00 | 7.27 |
|  | IP7.2 | 23.75 | 3.27 | 11.91 | 148 | 0.68 | 4.96 | 20.98 | 7.28 |

Inventive Polymerization IP4.1 Through IP4.5, IP5.1, IP5.2, IP6.1, IP6.2, IP7.1 and IP7.2

All inventive polymers have been simulated with lowering first peak temperature to 240° C., except for the IP4.1 example, operating the first peak temperature at 255° C. IP4.1 is used to set the claim boundary. The temperatures of the remaining peaks are increased to reach the target conversion levels. As can be observed, the combined effect of cold gas injection at the side of the reactor, and the low first peak temperature (as shown in all IP cases), result in significantly lower re-initiation temperatures of the second reaction zone.

Figure 5:
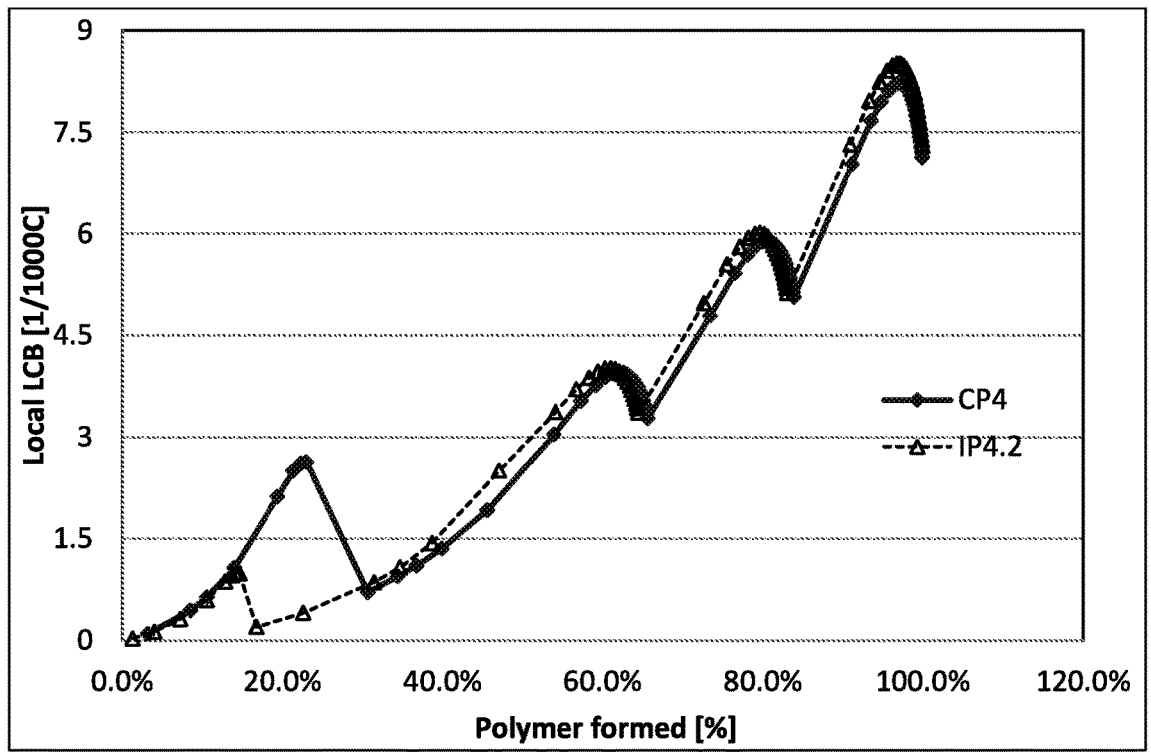
FIG. 5 depicts is "local Long Chain Branching (LCB) level versus polymer formed" for polymerizations CP4 and IP4.2.

Compared to comparative polymers (CP4, CP5, CP6, CP7), the properties of the inventive polymers clearly show lower LCBf$_{40\%}$ values. The associated LCB levels of local formed polymer along the reactor are shown for CP4 and IP4.2 in FIG. 5. The differences in these local LCB level profiles result surprisingly in a significant narrowing of MWD as shown by the normalized MWD values of CP4 and IP4.2, see Table 6.

Surprisingly it has been found that the sequence, in which LCB's are formed in the polymer, can have a profound effect on final MWD of the polymer. To make narrow MWD polymers, or polymers with a certain MWD at higher conversion levels, it is preferred to delay the formation of LCBs, and to keep the keep LCB level low in the first 40 wt % polymer formed, while the higher LCB level in the remaining polymer formed will not significantly affect the ability of the process to produce narrow MWD polymers or to produce polymers with certain MWD at higher conversion levels.

The influence of cold gas injection (CI) temperature on the polymer properties has been studied in the IP4.5 (CI temperature of 80° C.). Compared to the IP3 case (CI temperature of 40° C.) IP4.5 gives a higher re-initiation of the second reaction zone and slightly increased peak temperatures in the last three reaction zones. Overall IP4.5 has an increased LCBf$_{40\%}$ level and furthermore the MWD is broadened. The IP4.3 shows an example with a distribution of all fresh ethylene coming from the primary compressor to the reactor side stream. This distribution narrows the normalized MWD from 102% to 83%. Finally combining above distribution of the fresh ethylene to the reactor side streams with distributing all make-up CTA to the reactor front streams further narrows the normalized MWD reduces to 80%.

Figure 6:
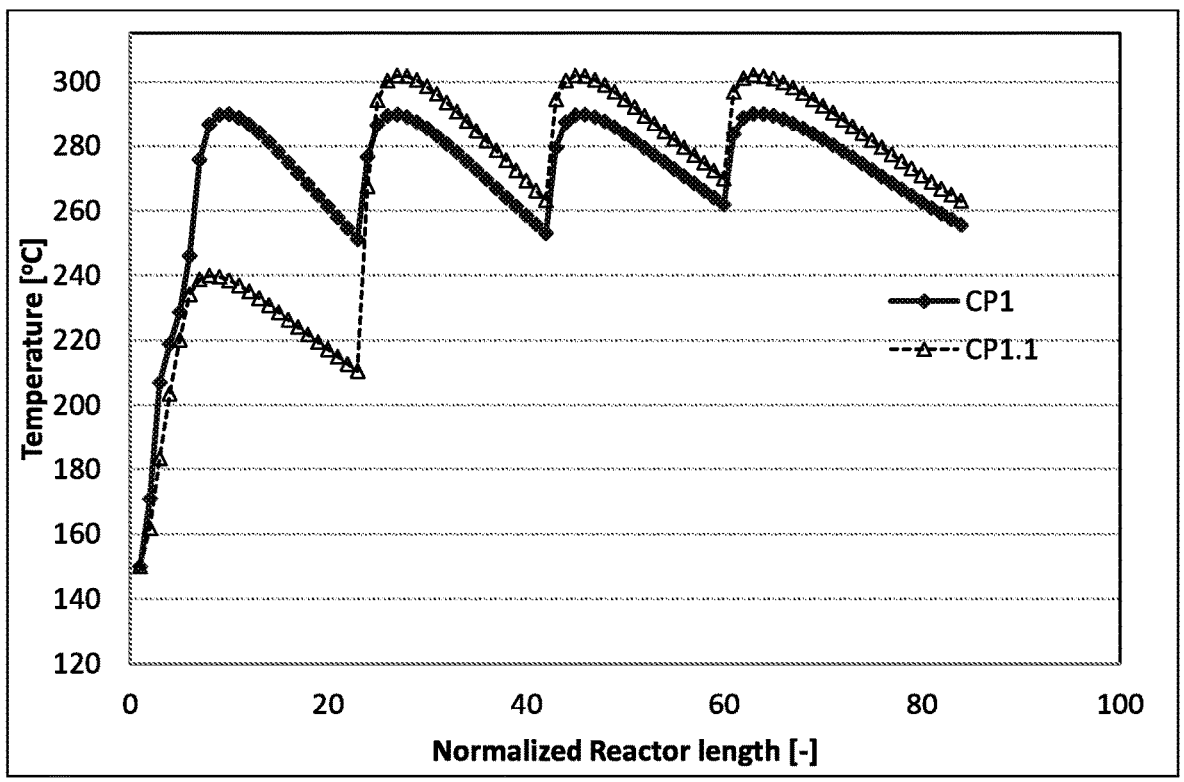
FIG. 6 depicts "Temperature profiles versus normalized reactor length" for polymerizations CP1 and CP1.1.
Figure 7:
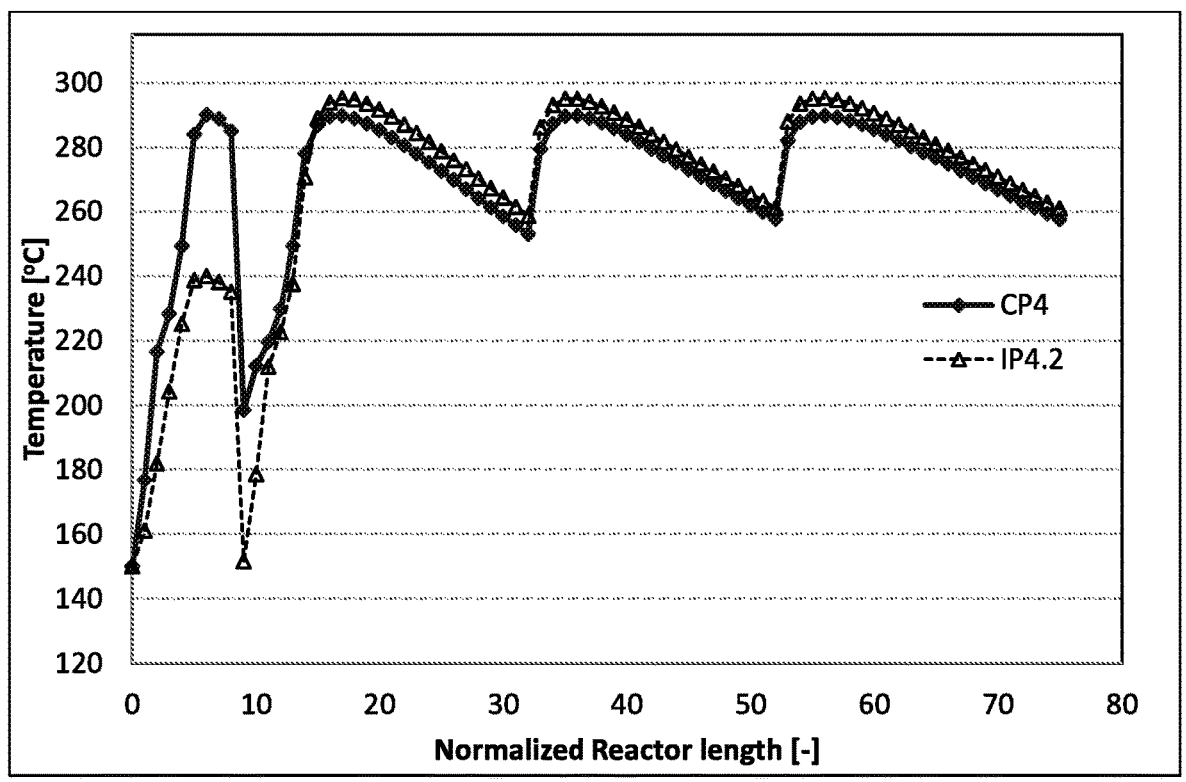
FIG. 7 depicts "Temperature profiles versus normalized reactor length" for polymerizations CP4 and IP4.2.

Similar benefits of the inventive lowering of the first peak temperature and favorable distributions of fresh ethylene and/or CTA are observed for the normalized MWD, when making polymers at different MI or with different activity CTAs (see IP6.1, IP6.2 for 10 MI, and IP7.1 and IP7.2 for CTA with Cs of 0.01. Temperature profiles of the comparative and inventive examples are shown in FIG. 6 and FIG. 7. Detail simulated conditions and polymer properties can be found in Table 4, Table 5 and Table 6.

Product Capability

Figure 8:
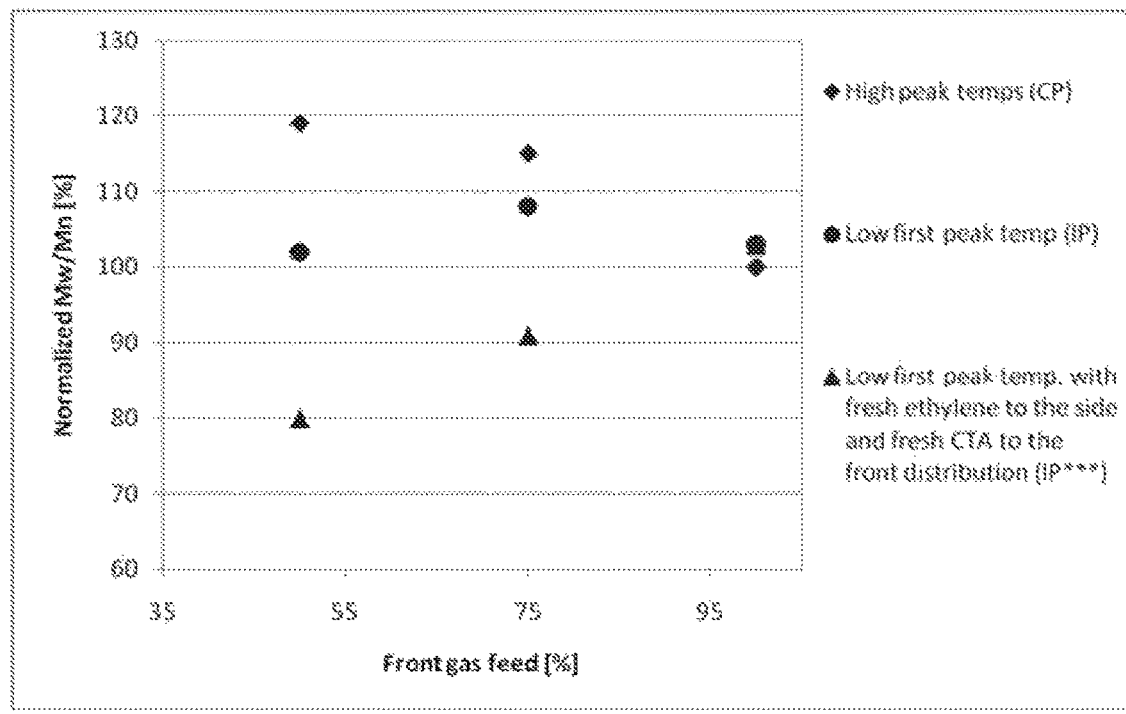
FIG. 8 depicts the "normalized Molecular weight distribution (Mw/Mn)" as function of front gas percentage (molar percent of total feed). Each diamond symbol represents a polymerization run using high peak temperatures; each circle symbol represents a polymerization run using a low front peak temperature; each triangle symbol represents a polymerization run using a low front peak temperature, and a fresh (make-up) CTA distribution to the front of the reactor, and a fresh (make-up) ethylene distribution to the side of the reactor.

The impact of the distribution of the ethylene-based feed streams, and the process conditions on the product properties (normalized MWD), has been plotted in FIG. 8. Surprisingly, it has been discovered that the inventive polymerization using a lower first peak temperature, in combination with a distribution of ethylene based feed flow over two feed streams, enhance the capability to produce narrow MWD polymers at a given conversion level. This effect is demonstrated in FIG. 8 by the diamond and open circle label data points. This inventive finding can be further improved by applying a favorable distributions of fresh ethylene and/or fresh CTA to further narrow the MWD of the polymer product, while maintaining a high conversion level.

Summary

It has been discovered that lowering the first peak temperature leads to the capability of producing narrow MWD products, even for the configuration where the ethylene feed is distributed over two ethylene feed streams. Combining lowering of the first peak temperature, with favorable distributions of fresh ethylene and/or fresh CTA, leads, at constant conversion level, to a narrower MWD than for the 100/0/0/0 ethylene feed distribution as used in CP1.

It has been discovered for a tubular process, that the MWD of the formed polymer can be influenced by staging the formation of long chain branches during the formation of polymer along the tubular reaction zones. Narrower MWD polymers, or polymers with similar MWD at higher conversion levels, can be achieved by lowering the LCB ratio ($R_{LCBf\ 40\%/LCBf\ 60\%}$) of the "first 40 wt % total polymer formed" to the "last 60 wt % of total polymer formed," for example, this ratio ≤22.5.

Furthermore, it was found that above discovery can be combined with other product and process parameters influencing the MWD of the ethylene-based polymers, described herein, such as, for example, the level of LCB in the final polymer (which is the result of the applied temperature, pressure and polymer concentration conditions), the distribution of the ethylene-based feed streams over the reactor zones, the distribution of make-up ethylene over the ethylene-based feed streams, the distribution of make-up CTA system over the reactor and/or ethylene based streams, the type and activity of applied CTA systems, and the melt-index of the final polymer.

The invention claimed is:

1. A process to form an ethylene-based polymer, in the presence of at least one free-radical, said process comprises at least the following:
   polymerizing a mixture comprising ethylene, in a reactor configuration comprising at least three reaction zones, and comprising two ethylene feed streams, and
   wherein the ratio ($R_{LCBf\ 40\%}$), in percent, of the "LCB content of the first 40 wt % of the total polymer formed" to "the total LCB content in the final polymer" is ≤22.5%; and wherein the amount of ethylene, and optionally one or more comonomers, and optionally one or more CTAs, fed to a first reaction zone of the at least three reaction zones, is from 40 mole % to 80 mole %, based on the total moles of ethylene, and optionally one or more comonomers, and optionally one or more CTAs, fed to the polymerization.

2. The process of claim 1, wherein the reactor configuration contains only two ethylene feed streams.

3. The process of claim 1, wherein the LCB ratio ($R_{LCBf\ 60\%/LCBf\ 40\%}$) of the "last 60 wt % total polymer formed" to the "first 40 wt % of total polymer formed," is greater than, or equal to, 6.8.

4. The process of claim 1, wherein the amount of ethylene, and optionally one or more comonomers, and optionally one or more CTAs, fed to the first reaction zone of the at least three reaction zones, is from 45 mole % to 75 mole %, based on the total moles of ethylene, and optionally one or more comonomers, and optionally one or more CTAs, fed to the polymerization.

5. The process of claim 1, wherein the ethylene conversion is greater than, or equal to, 28%.

6. The process of claim 1, wherein the ethylene is fed to the first reaction zone (i=1) of the at least three reaction zones and to a second subsequent reaction zone (i=n, and n>1) of the at least three reaction zones, and wherein the ethylene comprises fresh ethylene and recycle ethylene, and
   wherein for the subsequent reaction zone, the ratio, Rn, of "mole fraction of fresh ethylene fed to the first reaction zone (RZ1)" to "mole fraction of fresh ethylene fed to the nth reaction zone (RZn)" is (Rn=RZ1/RZn) less than, or equal to, 1; and
   wherein the "total amount of ethylene fed to the polymerization process" derives from at least one fresh ethylene stream and at least one recycled ethylene stream.

7. The process of claim 1, wherein a first ethylene feed stream of the two ethylene feed streams comprises from 30 to 100 mole % of the total amount of fresh CTA added to the polymerization, and wherein an activity (Cs) of a CTA system in the first ethylene feed (Z1) is greater than, or equal to, the activity (Cs) of the CTA system in a second ethylene feed (Z2) of the two ethylene feed streams,
   wherein the activity (Cs) of the CTA system may be from 0.01 to 0.33.

8. The process of claim 1, wherein the ethylene-based polymer has a melt index (I2) from 0.10 to 20.0 g/10 min.

9. The process of claim 1, wherein the mixture further comprises at least one CTA selected from an aldehyde, an alkane, a ketone, an alcohol, an ester, an alpha-olefin, or a combination thereof.

10. The process of claim 1, wherein the ethylene-based polymer is an LDPE.

* * * * *